US006603708B2

(12) United States Patent
Tamagawa et al.

(10) Patent No.: US 6,603,708 B2
(45) Date of Patent: Aug. 5, 2003

(54) INPUT OBJECT SELECTOR AND METHOD THEREFOR

(75) Inventors: Ken Tamagawa, Sagamihara (JP); Hiroshi Ishikawa, Shizuoka (JP)

(73) Assignee: International Business Machines Corporation, Armonk, NY (US)

( * ) Notice: Subject to any disclaimer, the term of this patent is extended or adjusted under 35 U.S.C. 154(b) by 237 days.

(21) Appl. No.: 09/683,412

(22) Filed: Dec. 21, 2001

(65) Prior Publication Data

US 2002/0118603 A1 Aug. 29, 2002

(30) Foreign Application Priority Data

Dec. 26, 2000 (JP) ........................................ 2000-396203

(51) Int. Cl.⁷ ........................ G04B 47/00; G04C 17/00; G04C 19/00; G09G 5/00
(52) U.S. Cl. ........................ 368/10; 368/69; 368/82; 345/168; 345/169; 345/173
(58) Field of Search ........................ 368/10, 69, 70, 368/82, 239, 28, 276, 281; 345/168–174

(56) References Cited

U.S. PATENT DOCUMENTS

| 5,003,503 | A | * | 3/1991 | Lapeyre | ................. | 364/710.12 |
| 5,258,748 | A | * | 11/1993 | Jones | ......................... | 345/172 |
| 6,231,252 | B1 | * | 5/2001 | Kitamura | ..................... | 400/484 |
| 6,271,835 | B1 | * | 8/2001 | Hocksma | .................... | 345/168 |
| 6,275,216 | B1 | * | 8/2001 | Kitamura | ..................... | 345/171 |

FOREIGN PATENT DOCUMENTS

JP  7-152469  6/1995  ........... G06F/3/023

\* cited by examiner

*Primary Examiner*—Vit Miska
(74) *Attorney, Agent, or Firm*—Derek S. Jennings

(57) ABSTRACT

An input object selector of a finger touch type that can, without any problem, be installed in a small space, such as an information terminal watch, and that provides a satisfactorily efficient process for selecting input objects.

23 Claims, 24 Drawing Sheets

INPUT OBJECT SELECTOR AND METHOD THEREFOR

BACKGROUND OF INVENTION

1. Field of the Invention

The present invention relates to an input object selector mounted, for example, in an information terminal watch and used for entering characters in a handy information device and a wrist information device equipped with the input object selector, and to an input object selection method.

2. Background Art

For an information device, such as an information terminal watch, a handy telephone or a PDA (Personal Digital Assistant), that is carried by or attached to a user, a reduction is desired in the space required for mounting an operating unit for entering characters and for selecting functions.

Various conventional techniques (e.g., Japanese Unexamined Patent Publication No. Hei 7-152469) have been disclosed for reducing the space needed when mounting an operating unit for entering characters; for example, one technique, which is used for handy telephones, calls for the use of a touch panel on which the individual keys of a set of ten are allocated for multiple characters and functions, and when a desired character or function is to be selected, an assigned key must be depressed multiple times, while with another technique, keys are allocated in accordance with their various levels, and to bring up a desired character, one of a limited number of keys at a higher level, a key that controls the allocation of subordinate keys, is depressed to activate multiple keys at the next level, and this process is repeated sequentially until finally the key is depressed that individually represents the character or character string for which the sequence was initiated.

For example, to input cursive kana characters (hiragana), a desired character must be selected from among more than 50 hiragana characters. With a touch panel that has a satisfactorily large area, such as one that is provided for a car navigation device, required character input efficiency is obtained. However, when the area available for making a choice on a touch panel is small, about the size of a finger tip, as it is on an information terminal watch, only a small number of objects can be presented on a screen for a user's selection. Moreover, for a user to make a final selection of one of multiple input objects, there is a drastic increase in the time required to make that selection, accompanied by a considerable reduction in operating efficiency. When keys are to be used for the selection of input objects, the need for smooth operation of the keys dictates that the keys, at the least, have a predetermined size and be separated by predetermined intervals, so that as a result the space required for a ten-key arrangement is increased. Further, if instead, the number of keys is reduced, the number of times a user must depress the various keys when preparing correspondence is increased, and operating efficiency again suffers.

SUMMARY OF INVENTION

It is, therefore, one object of the invention to provide an input object selector for which installation in a small space presents no problems and for which satisfactory operating efficiency is ensured, even when overall the number of input objects is increased, a handy information device and a wrist information device on which the input object selector is mounted, and an input object selection method.

To achieve the above object, according to a first aspect of the invention, an input object selector comprises:

a linear contact portion, which is linearly extended within a predetermined range, that a user can contact with a finger and along which the user can slide the finger, in the direction in which the linear contact portion is extended, to an arbitrary location;

a contact detector, for detecting the contact of the linear contact portion by the finger and identifying the location that is contacted;

first correlation means, for correlating, in a predetermined order (hereinafter referred to as a "predetermined order A"), multiple input objects with locations arranged at first intervals in the direction in which the linear contact portion is extended (hereinafter, the correlation effected by the first correlation means is referred to as a "first correlation");

range detection means, for detecting an order range (hereinafter referred to as an "order range B") wherein an input object, which is correlated by the first correlation with a start location whereat the finger first contacted the linear contact portion, is included, and in accordance with the predetermined order A multiple input objects are included;

second correlation means, for correlating, in accordance with the predetermined order A, the input objects within the order range B with locations along the linear contact portion that are arranged at second intervals that are greater than the first intervals (hereinafter, the correlation by the second correlation means is referred to as a "second correlation");

correlated input object detection means, for detecting, when the location whereat the finger contacts the linear contact portion is changed during a period extending from when the finger first contacted the linear contact portion until the contact was removed (hereinafter referred to as a "finger contact period"), an input object that is correlated by the second correlation with a location along the linear contact portion currently contacted by the finger; and input determination means, for determining as current user input the input object that is detected at a contact end location by the input object detection means.

According to a second aspect of the invention, a handy information device includes an input object selector as disclosed according to the first aspect of the invention.

According to a third of the invention, a wrist information device includes an input object selector as disclosed according to the first and second aspects of the invention.

According to a fourth aspect of the invention, an input object selection method comprises the steps of:

preparing a linear contact portion, which is linearly extended within a predetermined range, that a user can contact with a finger and along which the user can slide the finger, in the direction in which the linear contact portion is extended, to an arbitrary location, and a contact detector, for detecting the contact of the linear contact portion by the finger and identifying the location that is contacted;

correlating, in a predetermined order (hereinafter referred to as a "predetermined order A"), multiple input objects with locations arranged at first intervals in the direction in which the linear contact portion is extended (hereinafter, the correlation effected by the first correlation means is referred to as a "first correlation");

detecting an order range (hereinafter referred to as an "order range B") wherein an input object, which is correlated by the first correlation with a start location whereat the finger first contacted the linear contact portion, is included, and in accordance with the predetermined order A multiple input objects are included;

for correlating, in accordance with the predetermined order A, the input objects within the order range B with locations along the linear contact portion that are arranged at second intervals that are greater than the first intervals (hereinafter, the correlation by the second correlation means is referred to as a "second correlation");

detecting, when the location whereat the finger contacts the linear contact portion is changed during a period extending from when the finger first contacted the linear contact portion until the contact was removed (hereinafter referred to as a "finger contact period"), an input object that is correlated by the second correlation with a location along the linear contact portion currently contacted by the finger; and determining as current user input the input object that is detected at a contact end location by the input object detection means.

Various other objects, features, and attendant advantages of the present invention will become more fully appreciated as the same becomes better understood when considered in conjunction with the accompanying drawings, in which like reference characters designate the same or similar parts throughout the several views.

DETAILED DESCRIPTION

Figure 1:
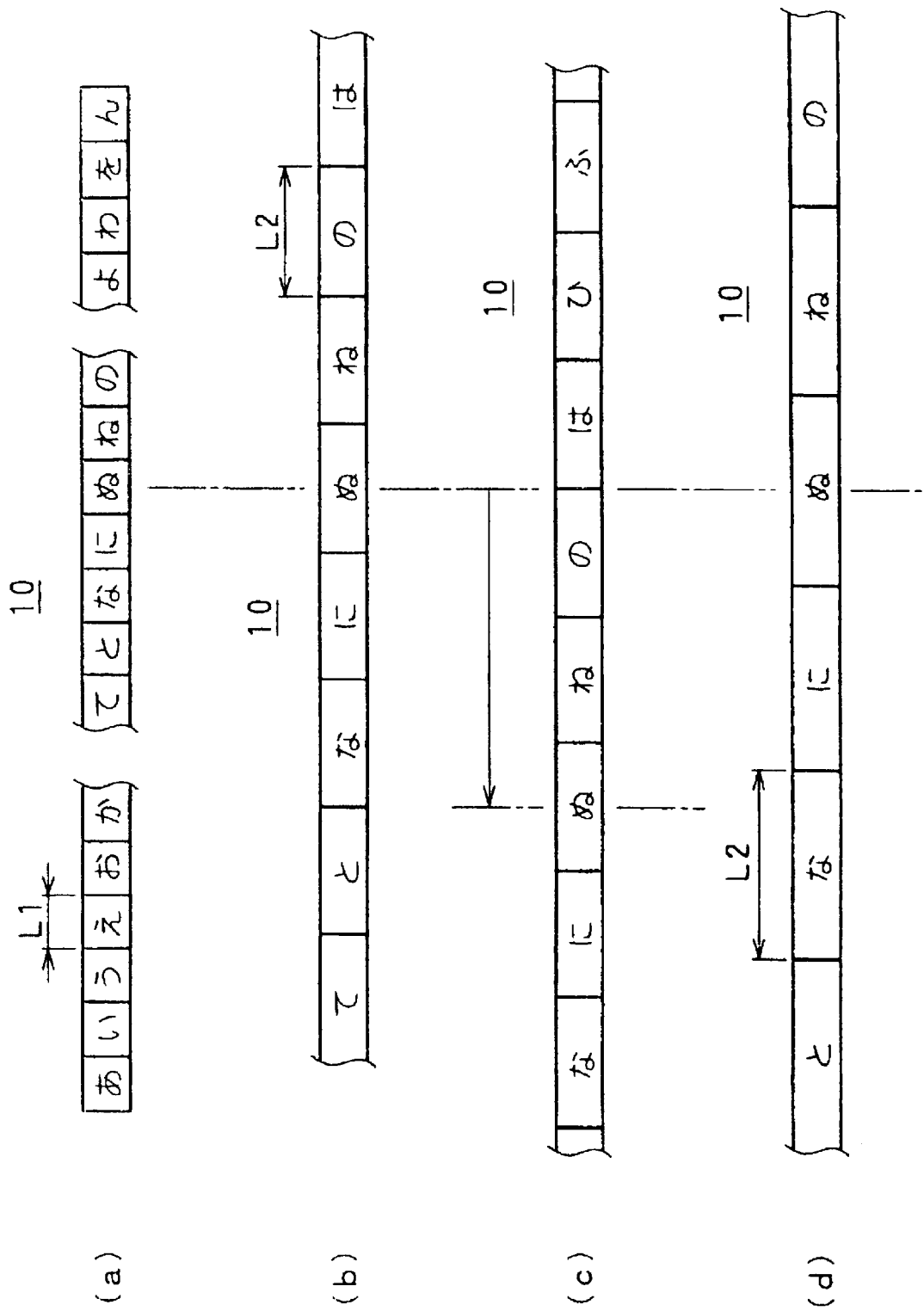
FIGS. 1(a)–1(d) are diagrams showing, for various conditions, correlations in a hiragana input mode between the locations on an input selector of a finger touch type and hiragana characters.

The linear contact portion, which naturally has a linear width of a predetermined size, is extended, for example, linearly, following a curved or a zigzag path, and is, for example, mounted on a plain face or a curved face. When, for example, an information device, wherein the input object selector is to be mounted, has a liquid crystal display device, the linear contact portion may be installed in the liquid crystal display portion, or may be located at the front or on the side of the body case. For the linear contact portion, a resistant film method, for detecting the contact pressure imparted by a finger, a coupling capacitance method, for detecting the potential of a finger, and an ultrasonic wave method, for transmitting an ultrasonic wave to the surface of the linear contact portion, are provided. The first intervals mentioned herein are basically equal, but they may differ slightly. Similarly, the second intervals mentioned herein are basically equal, but they may differ slightly. The contact detector, a digital type, for example, detects at predetermined time intervals finger contact and current contact locations for the linear contact portion, and employs the detection results to determine a contact start location and a contact end location and whether the current time falls within the finger contact period. It should be noted that the contact end time corresponds to the time at which a user removes his or her finger from the linear contact portion.

Note that in the following explanation an input object that a user currently intends to select is called, for convenience sake, a "target input object". Note also that when hiragana characters are selected in the Japanese input mode, the total number of input objects is 50 or more, and that when the available functions supplied by an information terminal are increased, the total number of input objects is likewise increased. Thus, a need exists for an improvement in the efficiency of the operation performed to select, from among multiple input objects, a specific target input object. For the input object selector, input objects are correlated with locations that are arranged at first intervals along the linear contact portion, and when a user touches with a finger a location on the linear contact portion corresponding to a target input object, if the user's finger accurately contacts the location corresponding to the target input object and is immediately thereafter removed, the target input object will be entered. Generally, however, since multiple input object locations are densely arranged on the linear contact portion, the start location whereat the user's finger contacts the linear contact portion does not correspond to the target input object, but is only near it. Under these circumstances, instead of the user's finger being removed, the user slides it across the linear contact portion toward the location corresponding to the target input object, since during the finger contact period, the input objects that are correlated with locations on the linear contact portion do not include all the input objects, but only those in the order range B. Further, during the finger contact period, the correlation of the input objects with the locations on the linear contact portion is changed from the first correlation to the second correlation. And in accordance with the second correlation, satisfactorily large second intervals can be obtained and actually set. Therefore, even when the start location whereat the user's finger first contacts the linear contact portion is distant from the target input object, the user can slide the finger along to the location, in the order range B, for which correlation of the target input object was accomplished in accordance with the second interval, and can accurately halt the finger at that location. Then, when the user removes the finger from the location on the linear contact portion that, in accordance with the second correlation, is correlated with the target input object, the target input object will be entered and the entry process terminated. In this manner, although multiple input objects are correlated with locations on the linear contact portion, which has a limited length, a target input object can be accurately and efficiently selected.

The concept of the display provided by the first display means includes not only the display on a display unit, such as the liquid crystal display portion of an information device wherein the input object selector is mounted, whose display contents can be changed as needed, but also the printing by the main body of the information device. Not all the first correlations may be displayed, but only either the correlation of specific input objects with their corresponding locations on the linear contact portion, or the correlation of input objects that are arranged in accordance with the predetermined order A at intervals corresponding to a predetermined number of objects, with their corresponding locations on the linear contact portion, may be displayed.

Since, based on the display by the first display unit, the user contacts with a finger a location on the linear contact portion that corresponds to the target input object, the start location whereat the finger contacts the linear contact portion can be near the location corresponding to the target input object, and thus, the efficiency of the succeeding operation can be improved.

Also for the display by the second display means, not all the second correlation need always be displayed, but only correlations that are intermittently extracted from the entire second correlation may be displayed. Based on the display by the second display unit, the user's finger can efficiently be slid until it reaches the location corresponding to the target input object.

In a preferable input object selector, an input object correlated with the location on the linear contact portion touched by the user's finger is echoed back to the input display unit, so that the user can identify the input object that is correlated with the location his or her finger is currently touching, without having to look at the display on the first and the second display means.

During the finger contact period, the display by the first display means is halted, and on the currently effective display the user can see only the input objects that are individually allocated to locations on the linear contact portion, and at this time, can smoothly touch the linear contact portion and remove his or her finger therefrom. When the same portion is used for the display by the first and the second display means, the size of the display area can be reduced.

Specifically, the first pressure range is set greater than the second pressure range. And for example, when it must be ascertained that the contact pressure at a location the finger has contacted is equal to or greater than a predetermined value, or is smaller than the predetermined value, the contact pressure can be detected by using piezoelectric devices that are distributed all along the length of the linear contact portion.

When the user slides the finger along the linear contact portion while maintaining a contact pressure within the first pressure range, the intervals can be increased between the locations on the linear contact portion that are correlated with the input objects, so that the target input object can be reached easily by the finger.

The second interval may be changed to a greater length level or a smaller length level, or three or more levels may be prepared for the second interval, so that the second interval can be cyclically changed to these levels by forcefully pressing against the linear contact portion with the finger.

Each time the user presses the linear contact portion with a finger during the finger contact period, the second interval is changed as needed, so that the length can be selected in accordance with the situation (e.g., either the Japanese kana character input mode or the function selection mode, the operating skill of each user, or the tastes of multiple users when they share the input object selector in common). As a result, the selection of an input object can be efficiently accomplished.

Specifically, the fourth pressure range is set greater than the third pressure range.

When, in accordance with the first correlation, the target input object is biased toward one end in the direction in which the linear contact portion is extended, and when the start location whereat the finger contacts the linear contact portion is biased away from the corresponding location of the target input object in the direction in which the linear contact portion is extended, the length from the contact start location to the end of the linear contact portion may be shortened, and the corresponding location of the target input object may be positioned outside, beyond the end of the linear contact portion, so that the user can not slide the finger across the linear contact portion to the location of the target input object. In this case, the user, for example, must forcefully press against linear contact portion with the finger, and slide the finger to the center of the linear contact portion. Then, for the input object that corresponds to the contact start location (hereinafter the input object is referred to as "an input object at the contact start"), the corresponding location on the linear contact portion is moved to substantially the center in the direction in which the linear contact portion is extended, and the length is increased from the location on the linear contact portion that corresponds to the input object at the contact start time to the end of the liner contact portion. As a result, the location corresponding to the target input object can be situated inside the linear contact portion. Therefore, the input object for which the corresponding location on the linear contact portion is biased toward the end of the linear contact portion can be efficiently selected.

For the linear contact portion, only the recessed portions, or the raised portions may be formed, or the recessed portions and the raised portions may be alternately formed in the direction in which the linear contact portion is extended. The concept of recessed/raised portions includes a structure wherein the contact face of the linear contact portion is raised or recessed like waves in the direction in which it is extended. It is preferable that the intervals between the recessed portions and/or raised portions equal the intervals between the locations on the linear contact portion that are correlated with adjacent input objects in accordance with the second correlation. When a user slides a finger along the linear contact portion from the contact start location to the corresponding location of the target input object, the user can detect the distance traveled by using as a reference the sensation produced by the recessed and/or raised portions, and can efficiently select the target input object.

The process other than the input selection is, for example, an input cancellation process. When the contact start location is incorrect, and when the finger is removed from the linear contact portion, the input object that is correlated with the incorrect location is selected. In this case, a method for first establishing the incorrect entry and for then deleting it may be employed. However, if the input is canceled by increasing the distance over which the finger is slid, the efficiency of the operation can be improved.

The concept of the selection of menu items includes the selection of various functions, selection of a command and selection of a mode. The mode selection includes, for example, the selection of the hiragana input mode and of the alphabetical input mode. The menu item may be set only as a selection for various functions, such as the selection of a command or the selection of a mode, or may be so set that it covers all types of selections. That is, the individual locations in the first range of the linear contact portion may be allocated to the selection of various functions, and the locations in the next range may be allocated for the selection of a command.

The concept of the information device includes an information terminal that can access a network, such as the Internet or a LAN, and a device equipped with a handy telephone function.

The wrist information device is detachable from to the wrist of a user. Further, the concept of the wrist information device includes an information terminal that can access a network, such as the Internet or a LAN, and a device equipped with a handy telephone function.

The preferred embodiment of the present invention will now be described while referring to the accompanying drawings.

Figure 12:
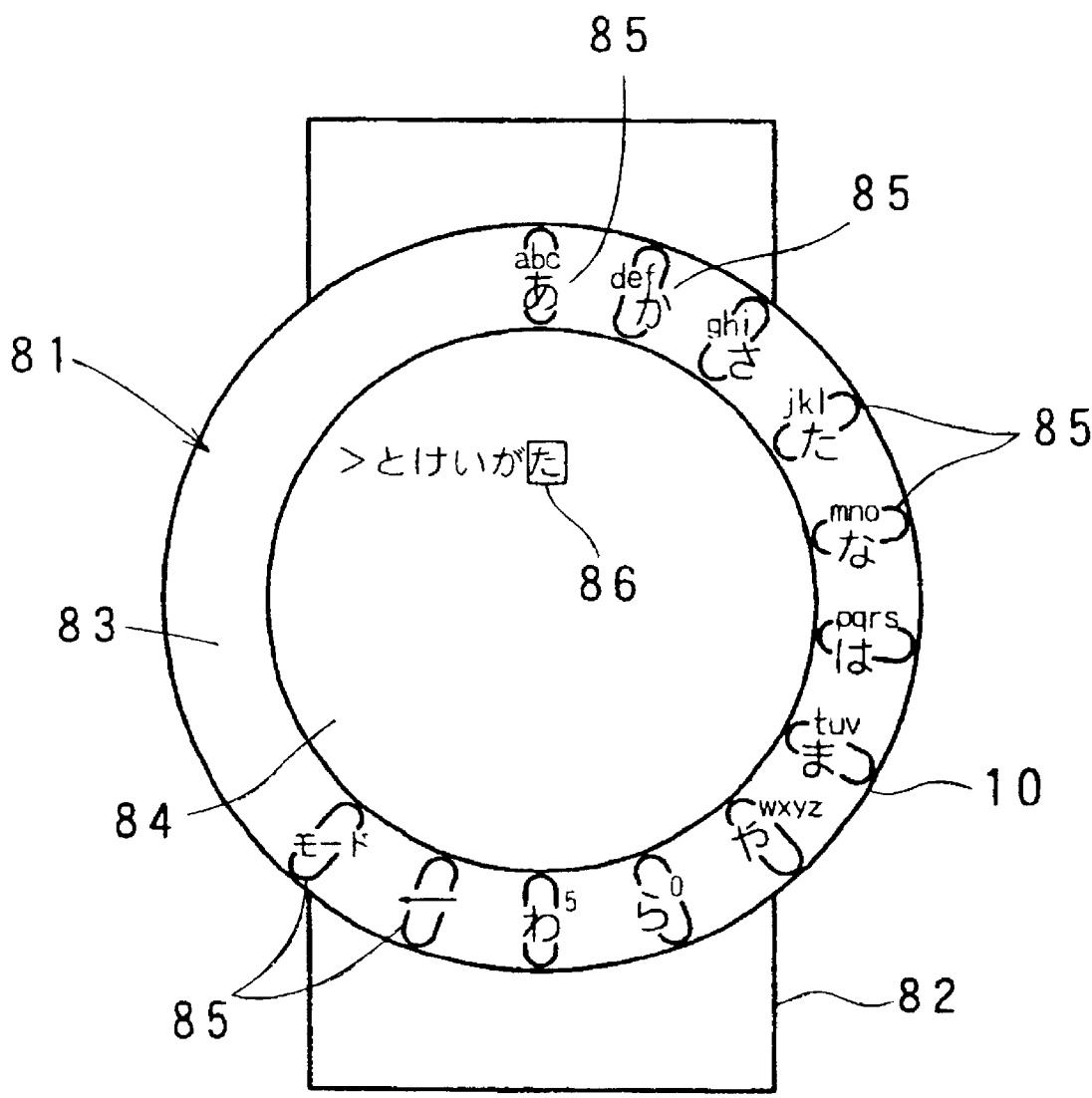
FIG. 12 is a front view of an information terminal watch whereon the input selector of a finger touch type is mounted as a bezel.

FIG. 1 is a diagram showing, for various conditions, the correlation in the hiragana input mode between the locations and hiragana characters of a finger touch type input selector 10. The first correlation is shown in FIG. 1A, and the second correlation is shown in FIGS. 1B to 1D. In FIG. 12 the input selector 10 of a finger touch type, which serves as a unit the finger of a user contacts, is installed in a bezel 83, which will be described later, and is incorporated in an information terminal watch 80. The hiragana characters are arranged in one row in kana syllabary order, "see the Hiragana Character Table (HCT) 1 through "HCT 2", and as is shown in FIG. 1A, are correlated with locations allocated on the input selector 10 at equal intervals L1. The arrangement of the hiragana characters shown in FIG. 1 is merely an example used to facilitate the explanation of the invention, and for the hiragana input that will actually be employed with a product, a sonant symbol and another symbol are also selected by using the same input system. Before the finger of a user touches the input selector 10, predetermined hiragana characters are correlated with the locations on the input selector 10 by the first correlation. In the first correlation, all of the hiragana characters are correlated with predetermined locations described on the input selector 10. Assume that a user touches kana character "HCT 3", which is allocated in accordance with the first correlation. Accordingly, the correlations of the locations on the input selector 10 with allocated hiragana characters is changed from those of the first correlation to those of the second correlation shown in FIG. 1B. For the kana character "HCT 3" of the second correlation in FIG. 1B, the first correlation character allocated for the contact start location, the same relative alignment is maintained as for the first correlation, but the size of the locations within which it and other hiragana characters are centrally aligned corresponds to another equal interval L2, which has a greater length than the interval L1 (L2 >L1; L2 is, for example, 1.5 times the length of L1).

The location allocated by the second correlation for the hiragana character, which in accordance with the first correlation occupied the contact start location, may be shifted to the location on the input selector 10 allocated by the first correlation. For example, the second correlation may be set so as to centrally align, in the longitudinal direction of the input selector 10, the hiragana character that is located in the middle of the row wherein a hiragana character allocated to the contact start location by the first correlation belongs. As a specific example, if "HCT 4" were allocated for the contact start location by the first correlation, "HCT 5" would be the row wherein "HCT 4" belongs, and in accordance with the second correlation, "HCT 6" in the center of the row "HCT 5", could be aligned with the center of the input selector 10 in the longitudinal direction. At this time, the location of "HCT 4", which was allocated for the contact start location, would be changed as the switch from the first correlation the second correlation was effected.

Since in FIG. 1A and FIG. 1B the overall length of the input selector 10 is unchanged, regardless of whether the location corresponding to the hiragana character that is correlated with the contact start location is changed as the switch from the first correlation to the second correlation is effected, not all the hiragana characters can be correlated with locations on the input selector 10 by the second correlation. That is, only the hiragana characters, including "HCT 3", in a predetermined ordered range within the kana syllabary can be selected. If "HCT 3" is the hiragana character that should currently be input (hereinafter referred to as a "target hiragana"), a user removes a finger contacting the input selector 10, and as a result, "HCT 3" is input. The user can, through data echoed back to a liquid crystal display portion 84, for example, identify which hiragana was correlated with the location contacted by the finger before it was removed.

Since the interval L1 is a very small value, when a user tries to touch with a finger the location on the input selector 10 that is allocated to a target hiragana by the first correlation, generally, it may so happen that the finger will touch a location for another hiragana character that is near the target hiragana location. Here, we will assume that the contact start location is "HCT 3", even though the target hiragana is "HCT 7". In the state illustrated by FIG. 1B, without removing the contacting finger from the input selector 10, the user slides it to the location allocated for "HCT 7" by the second correlation. Then, by checking the data echoed back to the input display unit, the user can ascertain when the location allocated for the target hiragana "HCT 7"has been reached, and can remove the contacting finger from the input selector 10. In this fashion, the target hiragana "HCT 7" can be input.

Assume that the contact start location is "HCT 3", located a short distance from "HCT 8", which is the actual target hiragana. Since, in accordance with the first correlation, "HCT 3" is located nearer the rear, when viewed from the center in the longitudinal direction of the input selector 10 (the end at "HCT 1" is defined as the front of the input selector 10, and the end at "HCT 2" is defined as the rear of the input selector 10), when the finger touches the location corresponding to "HCT 3", the location corresponding to target hiragana "HCT 8" lies beyond the rear of the input selector 10. Thus, even when the finger is slid toward the rear of the input selector 10, it can not reach the character "HCT 8". In this case, while being pressed down even more strenuously, the finger is slid toward the center in the longitudinal direction of the input selector 10. Thus, as is shown in FIG. 1C, as the current contact location is changed, the location corresponding to "HCT 3", in accordance with the second correlation, is shifted toward the center in the longitudinal direction of the input selector 10, so that the pertinent location matches the current contact location. When the location corresponding to "HCT 3" is moved a satisfactory distance toward the front of the input selector 10, i.e., when the location corresponding to the target hiragana is changed from the rear of the input selector 10 to an appropriate location therefor, the user reduces the force applied to the input selector 10 so it is equal to or less than a predetermined value, i.e., the force exerted returns the force that was applied originally. Then, when the user slides the finger to the target hiragana "HCT 8" and removes it from the input selector 10, the target hiragana "HCT 8" is input.

In FIG. 1D, the process performed when the user forcefully presses the finger against the input selector 10 differs from the process in FIG. 1C, and the interval L2 used for the second correlation is changed to provide another difference. Since the interval L2 can be freely changed at two levels, the number of hiragana characters that are allocated by the second correlation can be changed along the entire length of the input selector 10.

Figure 2:
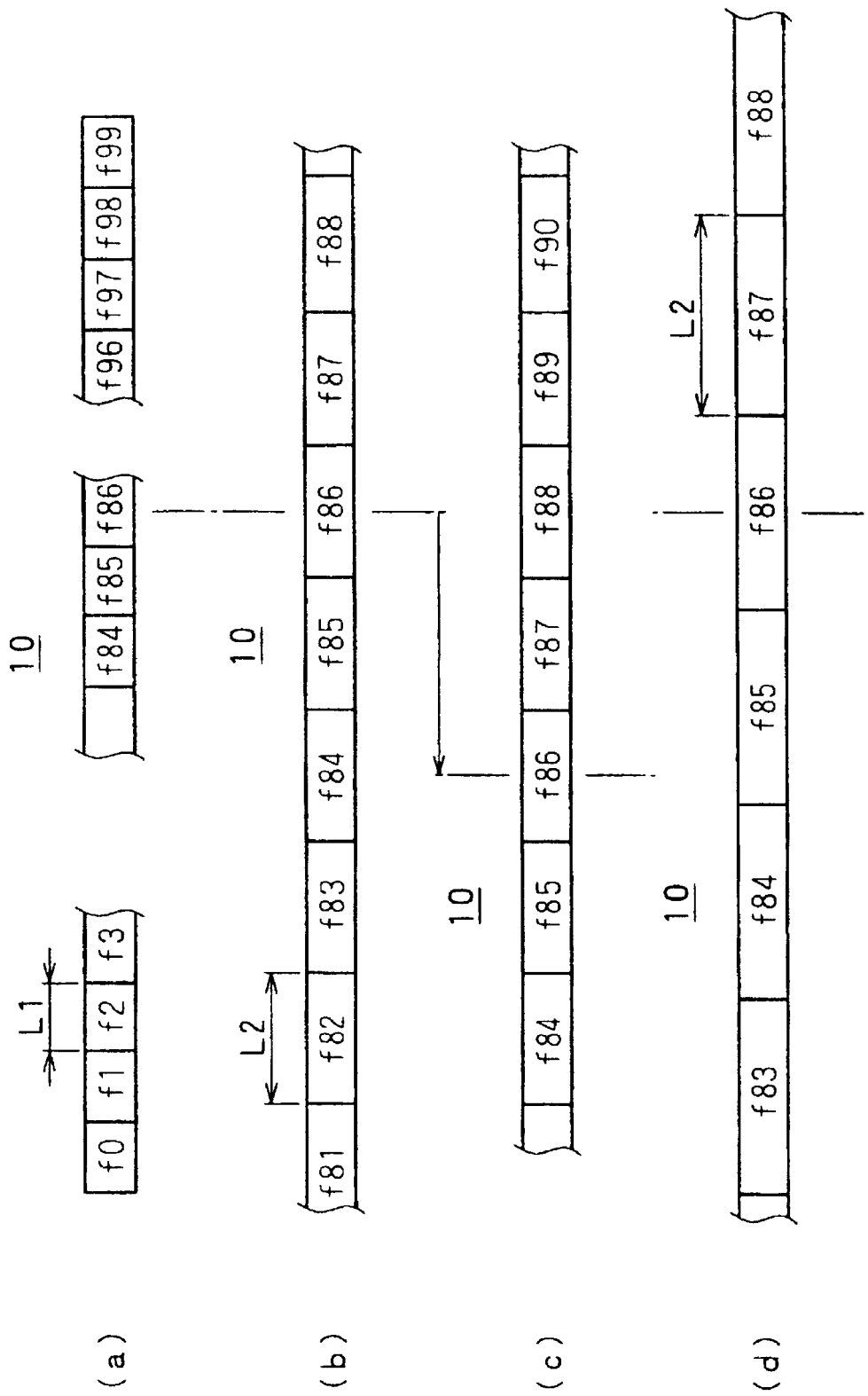
FIGS. 2(a)–2(d) are diagrams showing the correlation between commands and the locations on the input selector for various conditions.

FIG. 2 is a diagram showing, relative to various conditions, the correlation, in the function or command input mode, between the locations of the input selector 10 and functions or commands. The functions are, for example, the preparation and updating of schedules, the preparation and updating of To Do lists, and the preparation and updating of address books. The correlation in FIG. 2A is the first correlation, and the correlation in FIGS. 2A to 2D is the second correlation. In FIG. 2, it is assumed that a function or a command is indicated by the symbol f, and a total of 100 functions or commands, 0 to 99, is provided. An actual function or command is not represented by a symbol, but by a concrete term, such as "search", "transmission/reception" or "detection of a current location", so that a user can understand the contents of a command. Then, when the hiragana selection mode is changed to a function or command selection mode, the common input selector 10 is used for hiragana selection, or for function or command selection. The functions or commands are arranged in one row in a predetermined order, extending from "f0" to "f99", and as is shown in FIG. 2A, are correlated with the locations provided using the equal interval L1 on the input selector 10. The value L1 means the interval used for the first correlation in the function or command selection mode. In FIG. 1, this value need not match the value of L1, which is the interval for the first correlation in the hiragana selection mode. Similarly, the interval L2 in the hiragana selection mode need not match that in the function or command selection mode. Before a user touches a finger to the input selector 10, the relationship between the locations of the input selector 10 and the functions or commands is set by the first correlation. In the first correlation, all the functions or commands are correlated with predetermined locations of the input selector 10. Assume that the user touches by finger the location "f86" in the first correlation. The correlation of the locations of the input selector 10 and the allocated functions and commands when the correlation is changed to the second correlation, the same center location is maintained for the function or command "f86" that is allocated for the contact start location by the first correlation. However, the functions and the commands are allocated to the individual locations on the input selector 10 at a different equal interval L2 (L2>L1) that has a greater length than L1. Since the overall length of the input selector 10 is unchanged between FIG. 2A and FIG. 2B, not all the functions and commands are allocated to the input selector 10 by the second correlation. Only the functions or commands, including "f86", in a predetermined ordered range of the setting order can be selected by the second correlation. If "f86" is the function or command to be currently input (hereinafter referred to as a "target function or command"), the user removes the contacting finger from the input selector 10, and in this fashion, "f86" is input. It should be noted that, from data echoed back to the liquid crystal display portion 84, the user can identify the function or command corresponding to the location touched by the finger.

Since the interval L1 is a very small value, when a user tries to touch with a finger the location on the input selector 10 that is allocated to a target function or command by the first correlation, generally, it may so happen that the finger will touch a location for another function or command that is near the target function or command location. Here, we will assume that the contact start location is "f86", even though the target function or command is "f88". In the state illustrated by FIG. 2B, without removing the contacting finger from the input selector 10, the user slides it to the location allocated for "f88" by the second correlation. Then, by checking the data echoed back to the input display unit, the user can ascertain when the location allocated for the target function or command "f88"has been reached, and can remove the contacting finger from the input selector 10. In this fashion, the target function or command "f88" can be input.

Assume that the contact start location is "f86", located a short distance from "f90", which is the actual target function or command. Since, in accordance with the first correlation, "f86" is located nearer the rear, when viewed from the center in the longitudinal direction of the input selector 10 (the end at "f0" is defined as the front of the input selector 10, and the end at "f99" is defined as the rear of the input selector 10), when the finger touches the location corresponding to "f86", the location corresponding to target function or command "f90" lies beyond the rear of the input selector 10. Thus, even when the finger is slid toward the rear of the input selector 10, it can not reach the function or command "f90". In this case, while being pressed down even more strenuously, the finger is slid toward the center in the longitudinal direction of the input selector 10. Thus, as is shown in FIG. 2C, as the current contact location is changed, the location corresponding to "f86", in accordance with the second correlation, is shifted toward the center in the longitudinal direction of the input selector 10, so that the pertinent location matches the current contact location. When the location corresponding to "f86" is moved a satisfactory distance toward the front of the input selector 10, i.e., when the location corresponding to the target function or command is changed from the rear of the input selector 10 to an appropriate location therefor, the user reduces the force applied to the input selector 10 so it is equal to or less than a predetermined value, i.e., the force exerted returns the force that was applied originally. Then, when the user slides the finger to the target function or command "f90" and removes it from the input selector 10, the target function or command "f90" is input.

In FIG. 2D, the process performed when the user forcefully presses the finger against the input selector 10 differs from the process in FIG. 2C, and the interval L2 used for the second correlation is changed to provide another difference. Since the interval L2 can be freely changed at two levels, the number of functions or commands that are allocated by the second correlation can be changed along the entire length of the input selector 10.

Figure 3:
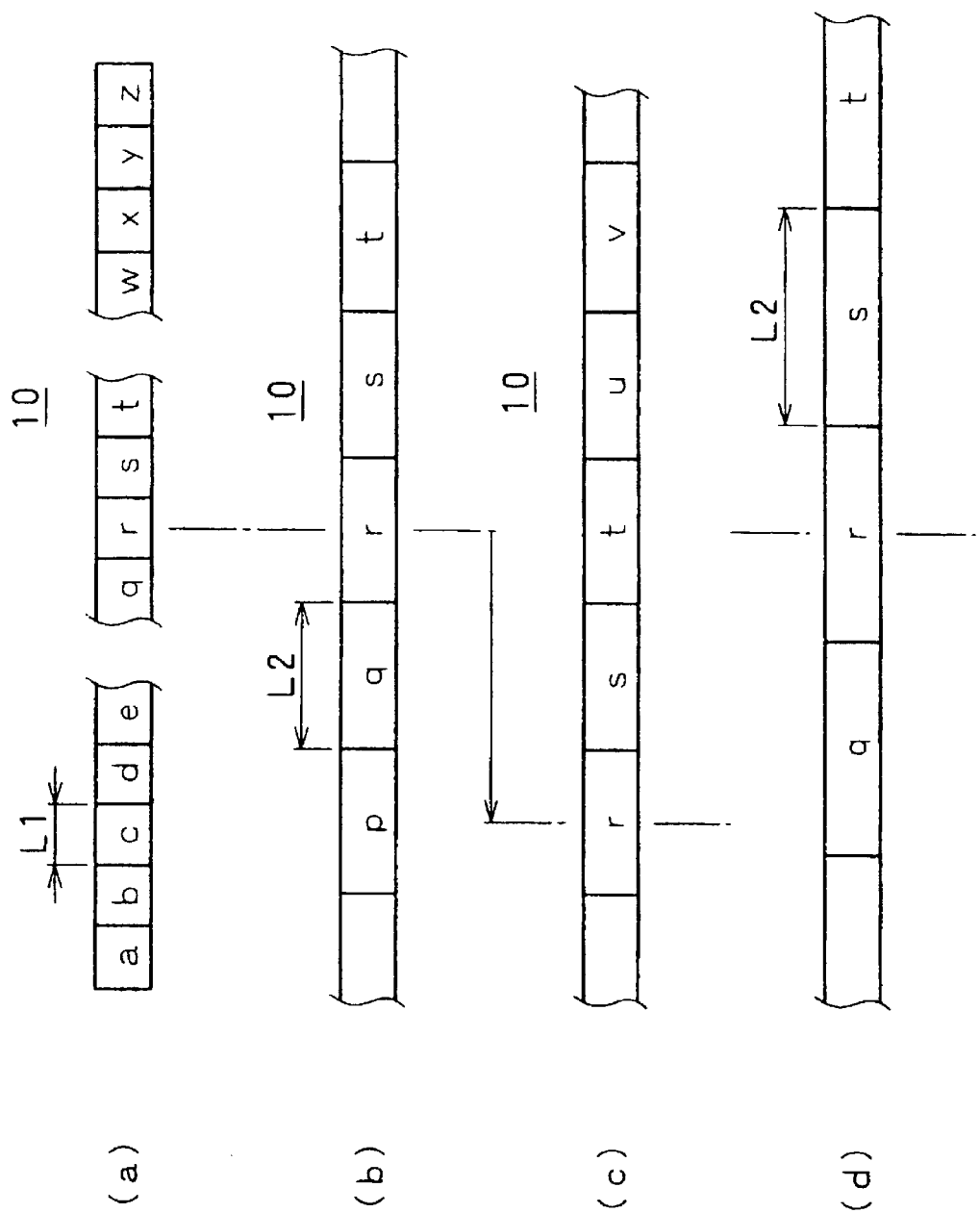
FIGS. 3(a)–3(d) are diagrams showing, for various conditions, the correlations in the alphabetic character input mode between the locations on the input selector and alphabetic characters.

FIG. 3 is a diagram showing, relative to various conditions, the correlations in the alphabetic input mode between the locations of the input selector 10 and the alphabetic characters. The correlation in FIG. 3A is the first correlation, and the correlation in FIGS. 3B to 3D is the second correlation. For convenience during the explanation, only upper case alphabetic characters are used. When a selection mode, such as the hiragana selection mode, is changed to the alphabet selection mode, the common input selector 10 is also used for alphabet selection. The alphabetic characters are arranged in a single row in alphabetical order, and as is shown in FIG. 3A, are correlated with locations provided at the equal interval L1 on the input selector 10. The value L1 means the interval used for the first correlation in the alphabet selection mode. In FIG. 1, this value need not match the value of L1, which is the interval for the first correlation in the hiragana selection mode. Similarly, the interval L2 in the hiragana selection mode need not match that in the alphabet selection mode. Before a user touches a finger to the input selector 10, the relationship between the locations of the input selector 10 and the alphabetic characters is set by the first correlation. In the first correlation, all the alphabetic characters are correlated with predetermined locations of the input selector 10. Assume that the user touches by finger the location "r" in the first correlation. The correlation of the locations of the input selector 10 and the allocated alphabetic characters is changed from FIG. 3A to FIG. 3B. Even when the correlation is changed to the second correlation, the same center location is maintained for the alphabet "r" that is allocated for the contact start location by the first correlation. However, the alphabetic characters are allocated to the individual locations on the input selector 10 at a different equal interval L2 (L2>L1) that has a greater length than L1. Since the overall length of the input selector 10 is unchanged between FIG. 3A and FIG. 3B, not all the alphabetic characters are allocated to the input selector 10 by the second correlation. Only the alphabetic characters, including "r", in a predetermined ordered range of the setting order can be selected by the second correlation. If "r" is the alphabetic character to be currently input (hereinafter referred to as a "target alphabetic character"), the user removes the contacting finger from the input selector 10, and in this fashion, "r" is input. It should be noted that, from data echoed back to the liquid crystal display portion 84, the user can identify the alphabetic character corresponding to the location touched by the finger.

Since the interval L1 is a very small value, when a user tries to touch with a finger the location on the input selector 10 that is allocated to a target alphabetic character by the first correlation, generally, it may so happen that the finger will touch a location for another alphabetic character that is near the target alphabetic character location. Here, we will assume that the contact start location is "r", even though the target alphabetic character is "t". In the state illustrated by FIG. 3B, without removing the contacting finger from the input selector 10, the user slides it to the location allocated for "t" by the second correlation. Then, by checking the data echoed back to the input display unit, the user can ascertain when the location allocated for the target alphabetic character "t" has been reached, and can remove the contacting finger from the input selector 10. In this fashion, the target alphabetic character "t" can be input.

Assume that the contact start location is "r", located a short distance from "v", which is the actual target alphabetic character. Since, in accordance with the first correlation, "r" is located nearer the rear, when viewed from the center in the longitudinal direction of the input selector 10 (the end at "A" is defined as the front of the input selector 10, and the end at "Z" is defined as the rear of the input selector 10), when the finger touches the location corresponding to "r", the location corresponding to target alphabetic character "v" lies beyond the rear of the input selector 10. Thus, even when the finger is slid toward the rear of the input selector 10, it can not reach the alphabetic character "v". In this case, while being pressed down even more strenuously, the finger is slid toward the center in the longitudinal direction of the input selector 10. Thus, as is shown in FIG. 3C, as the current contact location is changed, the location corresponding to "r", in accordance with the second correlation, is shifted toward the center in the longitudinal direction of the input selector 10, so that the pertinent location matches the current contact location. When the location corresponding to "r" is moved a satisfactory distance toward the front of the input selector 10, i.e., when the location corresponding to the target alphabetic character is changed from the rear of the input selector 10 to an appropriate location therefor, the user reduces the force applied to the input selector 10 so it is equal to or less than a predetermined value, i.e., the force exerted returns the force that was applied originally. Then, when the user slides the finger to the target alphabetic character "v" and removes it from the input selector 10, the target alphabetic character "v" is input.

In FIG. 3D, the process performed when the user forcefully presses the finger against the input selector 10 differs from the process in FIG. 3C, and the interval L2 used for the second correlation is changed to provide another difference. Since the interval L2 can be freely changed at two levels, the number of alphabetic characters that are allocated by the second correlation can be changed along the entire length of the input selector 10.

Figure 4:
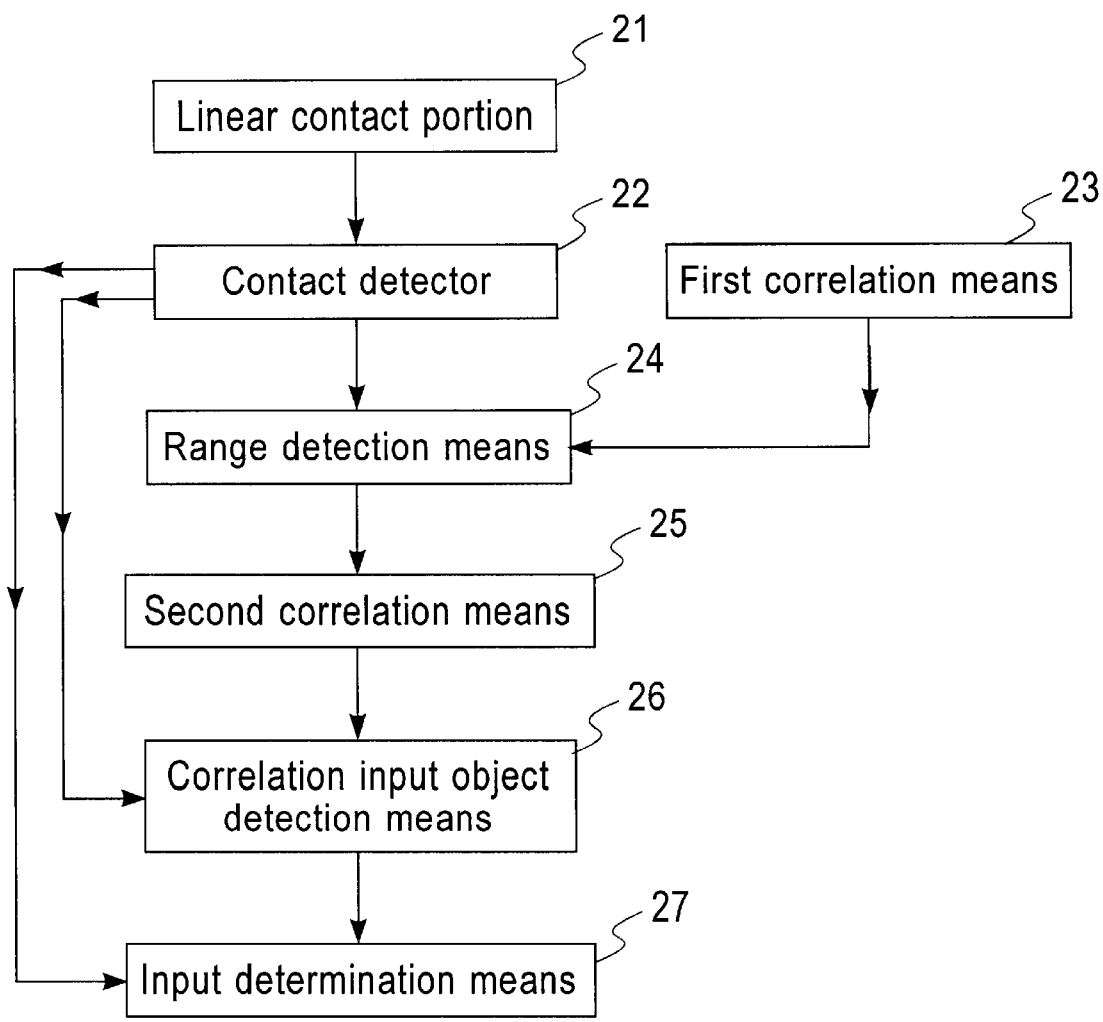
FIG. 4 is a diagram showing the functional blocks of the input object selector.

FIG. 4 is a functional block diagram showing an input object selector. A linear contact portion 21 and a contact detector 22 together constitute the above described finger touch type input selector 10. A user touches the linear contact portion 21 with a finger and selects and enters a desired object, and the contact detector 22 detects the location of the linear contact portion 21 that was touched. When the contact location on the linear contact portion 21 is not found, the contact detector 22 ascertains that the linear contact portion 21 was not touched by manner, whether or not the linear contact portion 21 was touched can be detected. First correlation means 23 performs the first correlation for the linear contact portion 21, and specifically allocates, in accordance with a predetermined setting order such as the order employed for the kana syllabary, all the hiragana characters or all the functions or commands in the current input mode to the locations that are provided at the equal intervals L1 in the direction in which the linear contact portion 21 is extended. Range detection means 24 receives, from the contact detector 22 and the first correlation means 23, a contact start location and information for the first correlation, and employs the contact start location to detect a predetermined range of the setting order. The ordered range detected by the range detection means 24 is a range that includes a predetermined number of input objects that are arranged in the setting order before and after an input object, used as a reference, that is correlated with the contact start location by the first correlation. Second correlation means 25 allocates the input objects to locations on the linear contact portion 21 based on the ordered range detected by the range detection means and in accordance with the second correlation. The second correlation satisfies the following conditions.

(a) The linear contact portion 21 is divided into locations sized in accordance with the equal intervals L2 (L2>L1), and input objects are allocated to the obtained segments in the order in which set.

(b) The input object that is allocated to the contact start location by the first correlation (hereinafter this input object is referred to as an "input object at the contact start") is maintained at the same relative location on the linear contact portion 21.

Correlation input object detection means 26 receives, from the contact detector 22 and the second correlation means 25, the current finger contact location on the linear contact portion 21 and information for the second correlation, and detects an input object that is allocated by the second correlation to the current finger contact location on the linear contact portion 21 (hereinafter this input object is referred to as a "current location correlated input object"). Input determination means 27 receives, from the contact detector 22 and the correlation input object detection means 26, the removal of a finger from the linear contact portion 21 and information concerning the current location correlated input object. Then, the input determination means 27 determines and processes, as the current input, the current location correlated input object upon the removal of the finger from the linear contact portion 21.

Figure 5:
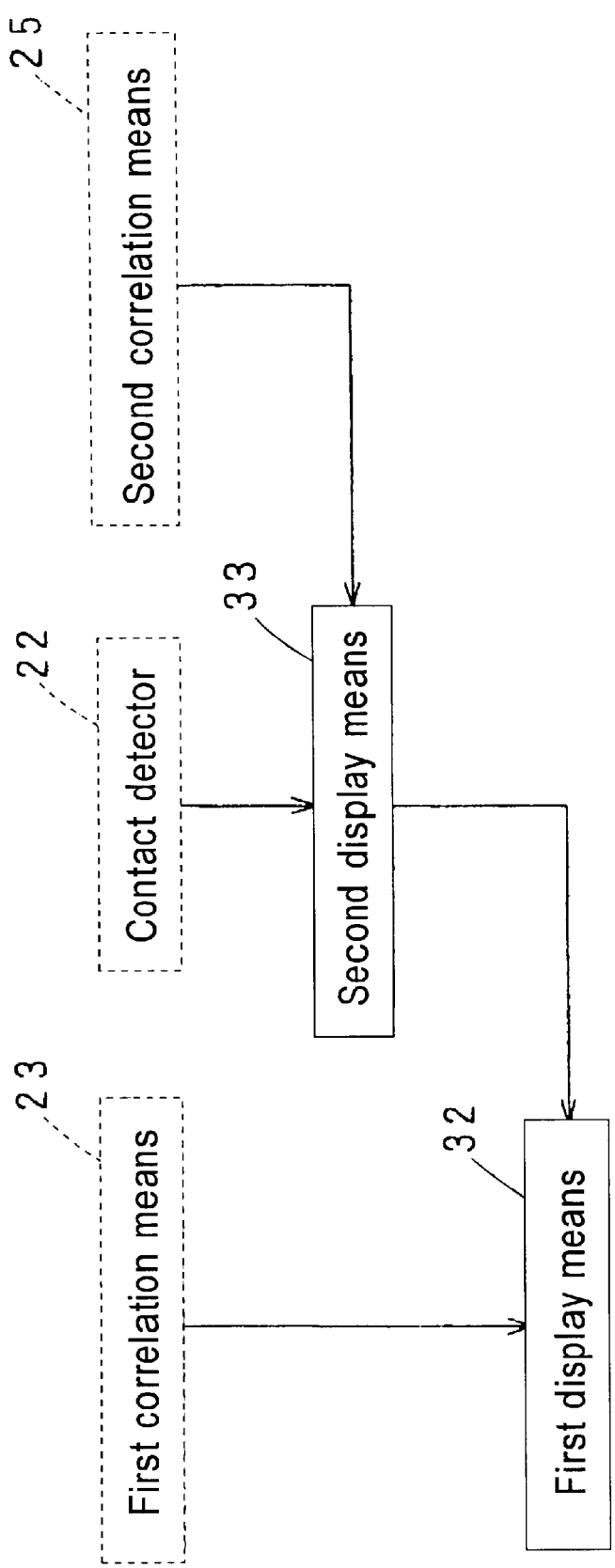
FIG. 5 is a functional block diagram showing a configuration wherein first and second display means are added to the functional blocks in FIG. 4.

FIG. 5 is a functional block diagram showing a configuration wherein means 32 and second display means 33 are added to the functional blocks in FIG. 4. In FIG. 5, the functional blocks added to the blocks in FIG. 4 are indicated by solid lines, and the common functional blocks are either indicated by broken lines or are not shown. The first display means 32 and the second display means 33, by means of the display, notifies the user of the input objects that are allocated for locations on the linear contact portion 21 by the first and second correlations. A display by the second display means 33 can be presented on an electronic display device, such as a liquid crystal display portion, or the display contents can be freely changed, as needed. The contents in accordance with the first correlation may be written on the case of an information device that incorporates the input selector 10, instead of being presented by the first display means 32. The second display means 33 receives, from the contact detector 22, information concerning whether the current time is in the finger contact period, and also receives, from the second correlation means 25, information for the second correlation while, each time it is in the finger contact period, notifying the user via the display of an input object that is allocated to each location on the linear contact portion 21. The first display means 32 halts the display during a period wherein the second display means 33 presents the display, or presents the display during a period where the second display means 33 halts the display. Therefore, the user sees only effective information relative to the input object that is currently allocated to the location on the linear contact portion 21, and operating confusion can be avoided.

Figure 6:
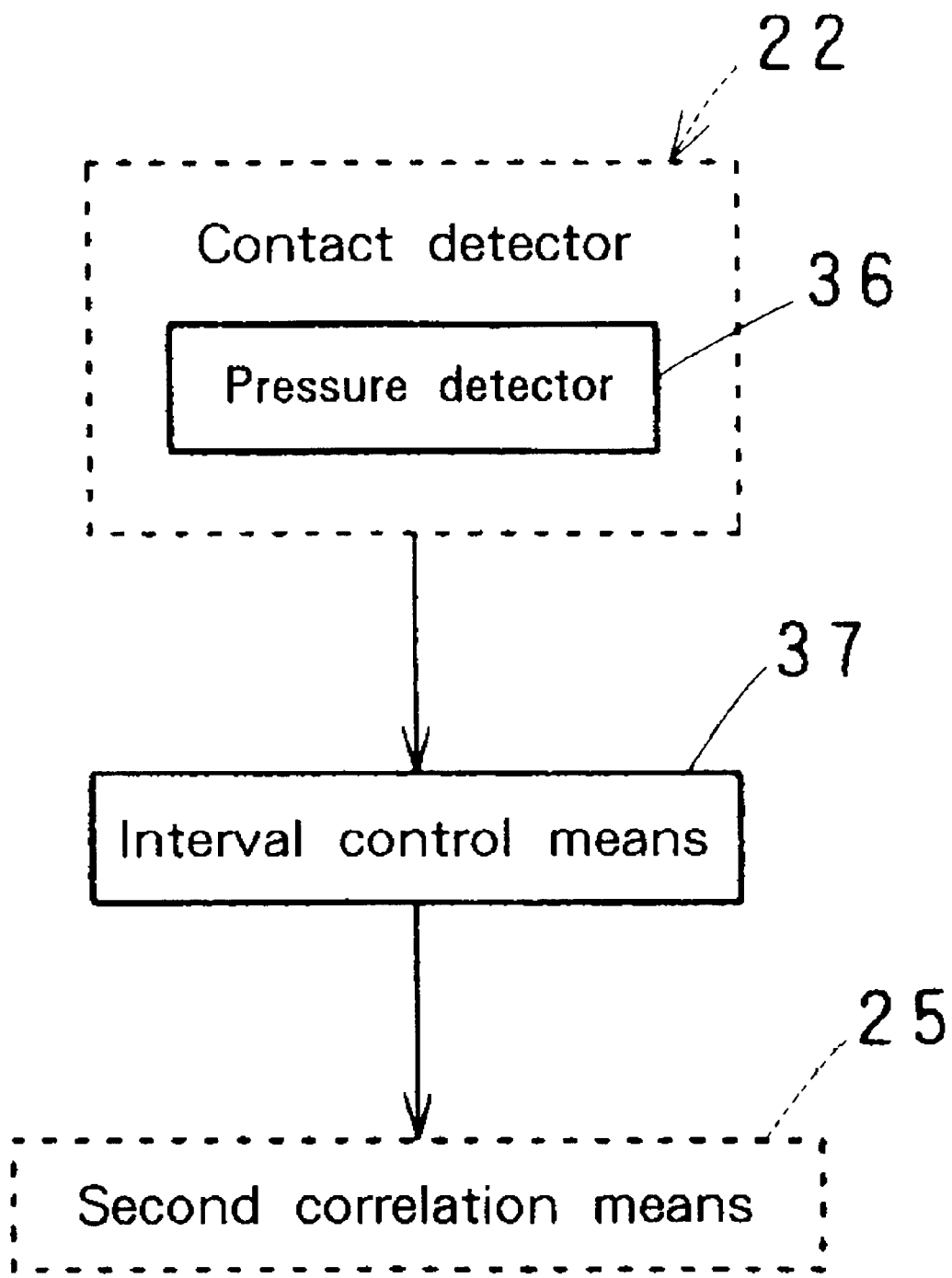
FIG. 6 is a functional block diagram showing a configuration wherein a pressure detector and interval control means are added to the functional blocks in FIG. 4.

FIG. 6 is a functional block diagram showing a configuration wherein a pressure detector 36 and an interval control means 37 are added. In FIG. 6, the functional blocks added to those in FIG. 4 are indicated by solid lines, and common functional blocks are either indicated by broken lines or are not shown. The first display means 32 incorporates the pressure detector 36, and the pressure detector 36 detects a contact pressure applied by a finger to the linear contact portion 21. In accordance with the pressure detected by the pressure detector 36, the interval control means 37 changes the length of interval L2 based on the second correlation. When the finger contact pressure applied to the linear contact portion 21 is smaller than a predetermined value, i.e., when the linear contact portion 21 is not very forcefully depressed by a finger, the interval control means 37 sets the normal length for the interval L2. When the finger contact pressure applied to the linear contact portion 21 is equal to or greater than a predetermined value, i.e., when the linear contact portion 21 is forcefully depressed, the interval control means 37 sets the interval L2 so its length is greater than normal. And when a user slides a finger along the linear contact portion 21 while maintaining a finger contact pressure on the linear contact portion 21 that is equal to or greater than the predetermined value, the input object at the current location can be changed based on a greater length that is assigned for the interval L2. In this manner, a user can change the length of the interval L2 in accordance with specific conditions, such as the input mode, and can efficiently select an input object.

The interval control means 37 can also have a different function from the function for increasing or reducing the interval L2 in accordance with the contact pressure of the finger to the liner contact potion 21 is equal to or greater than a predetermined value or less than that value. As the different function of the interval control means 37, for example, the information for the contact pressure of the finger on the linear contact portion 21 is received from the pressure detector 36, and each time where the contact pressure is changed to a value smaller than another predetermined value to a value equal to or greater than the predetermined value, the interval L2 is alternately increased or reduced. Once the user changes the interval L2 by strongly pushing the linear contact portion 21 by the finger, the changed value is maintained as the interval L2 even when the user weakens the pushing force to the original force. As a result, the operability is improved.

Figure 7:
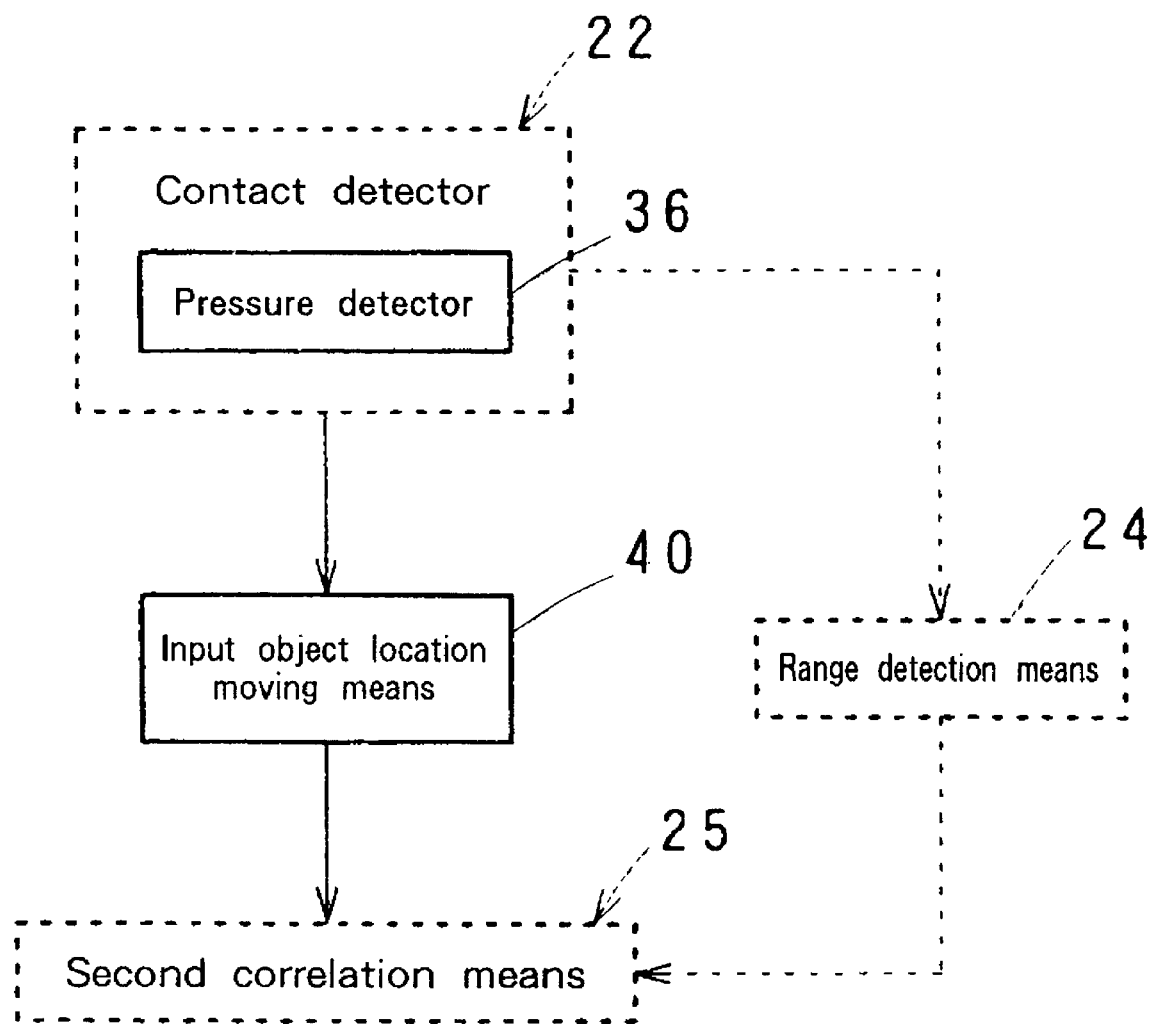
FIG. 7 is a functional block diagram showing a configuration wherein a pressure detector and input object location moving means are added to the functional blocks in FIG. 4.

FIG. 7 is a functional block diagram showing a configuration wherein the pressure detector 36 and an input object location moving means 40 are added to the functional blocks in FIG. 4. In FIG. 7, the functional blocks added to those in FIG. 4 are indicated by solid lines, and the common functional blocks are either indicated by broken lines or are not shown. The pressure detector 36 has the same function as in FIG. 6, and the input object location moving means 40 receives, from the pressure detector 36, information concerning the finger contact pressure applied to the portion 21 and determines whether the finger contact pressure is equal to or greater than a predetermined value (this value can be set independently of the predetermined value explained while referring to FIG. 6). An input object that is allocated by the second correlation to a contact location when the finger pressure contact is equal to or greater than the predetermined value is called a "designated input object" and the input object location moving means 40 detects the designated input object based on information received from the contact detector 22 and instructs the second correlation means 25 to correct the second correlation, so that in the finger contact period, the designated input object can be allocated to the current contact location, even though a user is sliding a finger along the linear contact portion 21. As a result, even when the contact start location is shifted toward one end of the linear contact portion 21 and the location corresponding to the target input object is closer to that end than the contact start location and is allocated by the second correlation to a location outside the linear contact portion 21, by moving the input object the location of the designated input object can be returned so it is situated inside the linear contact portion 21. Then, a user can reduce the finger contact pressure so it is less than the predetermined value, i.e., can reduce the finger contact pressure, and can slide a finger to the location corresponding to the target input object and select the target input object without any problem.

Figure 8:
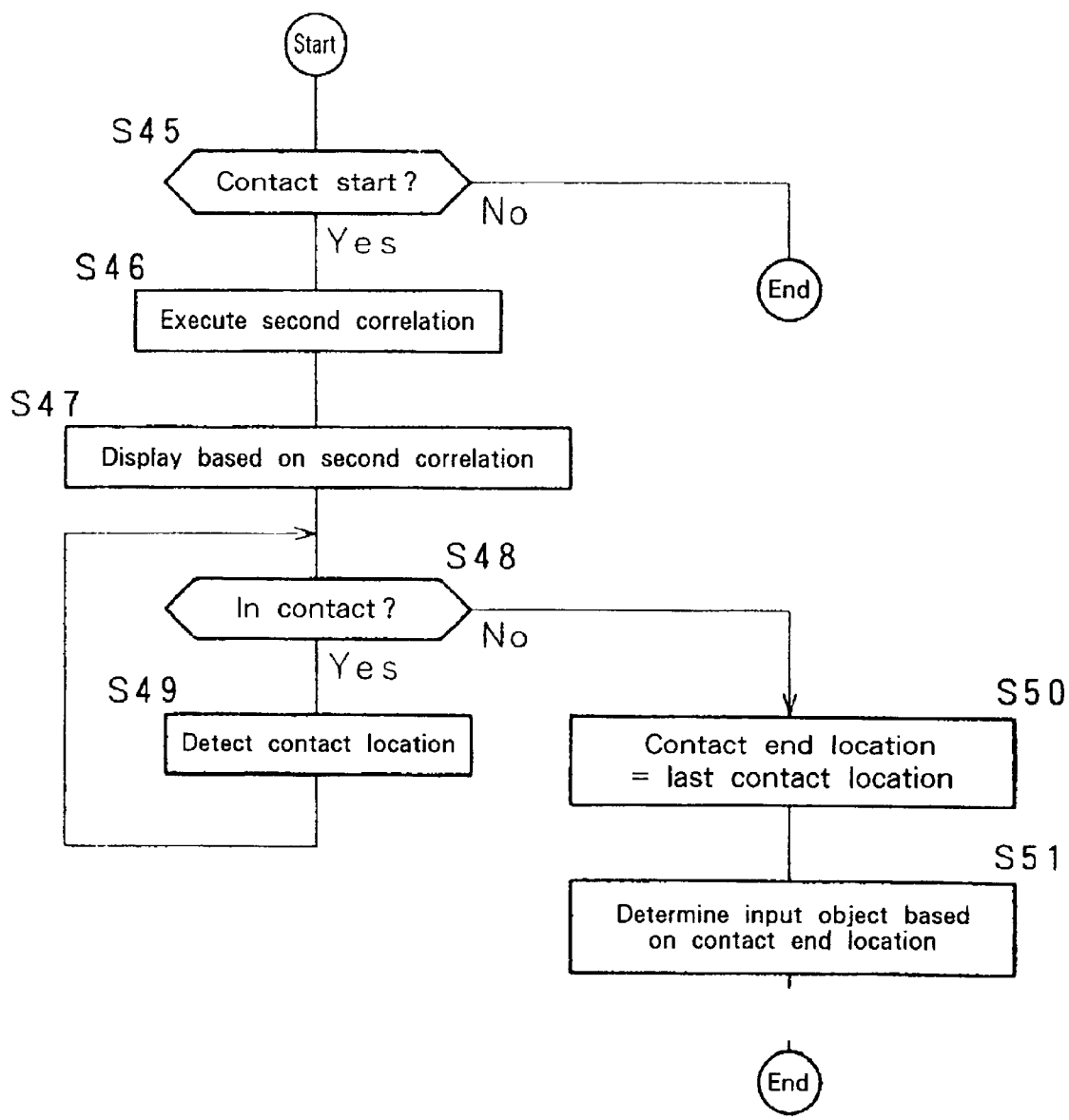
FIG. 8 is a flowchart showing an input target selection program.

FIG. 8 is a flowchart for an input object selection program. At step S45, a check is performed to determine whether a user's finger has been brought into contact with and is touching the linear contact portion 21. When the decision is Yes, program control advances to step S46, but when the decision is No, the processing for this program is terminated. At step S46, based on the second correlation, input objects are allocated to the individual locations on the linear contact portion 21. According to the second correlation, the linear contact portion 21 is divided into equal intervals L2 in the direction in which the portion 21 is extended. For an input object that is allocated to the contact start location on the linear contact portion 21 by the first correlation (hereinafter this input object is referred to as a "contact start location corresponding input object"), the location on the linear contact portion 21 allocated by the first correlation is also allocated by the second correlation. It should be noted that the length to be allocated is changed from L1 to L2, and that multiple input objects in a predetermined setting ordered range, to include the contact start location corresponding to the input object, are allocated to the individual locations on the linear contact portion 21 in accordance with the setting order and the second correlation. At step S47, the display according to the second correlation is presented, and at step S48, a check is performed to determine whether the finger contact with the linear contact portion 21 has been maintained. When the decision is Yes, program control advances to step S49, but when the decision is No, program control is shifted to step S50. At step S49, the current contact location is detected, and program control returns to step S48. In this manner, during the finger contact period, the current contact location is constantly updated. Then at step S30, the last contact location is regarded as a contact end location, and at step S51, the input object that is allocated to the contact end location by the second correlation is determined to be a current input object.

Figure 9:
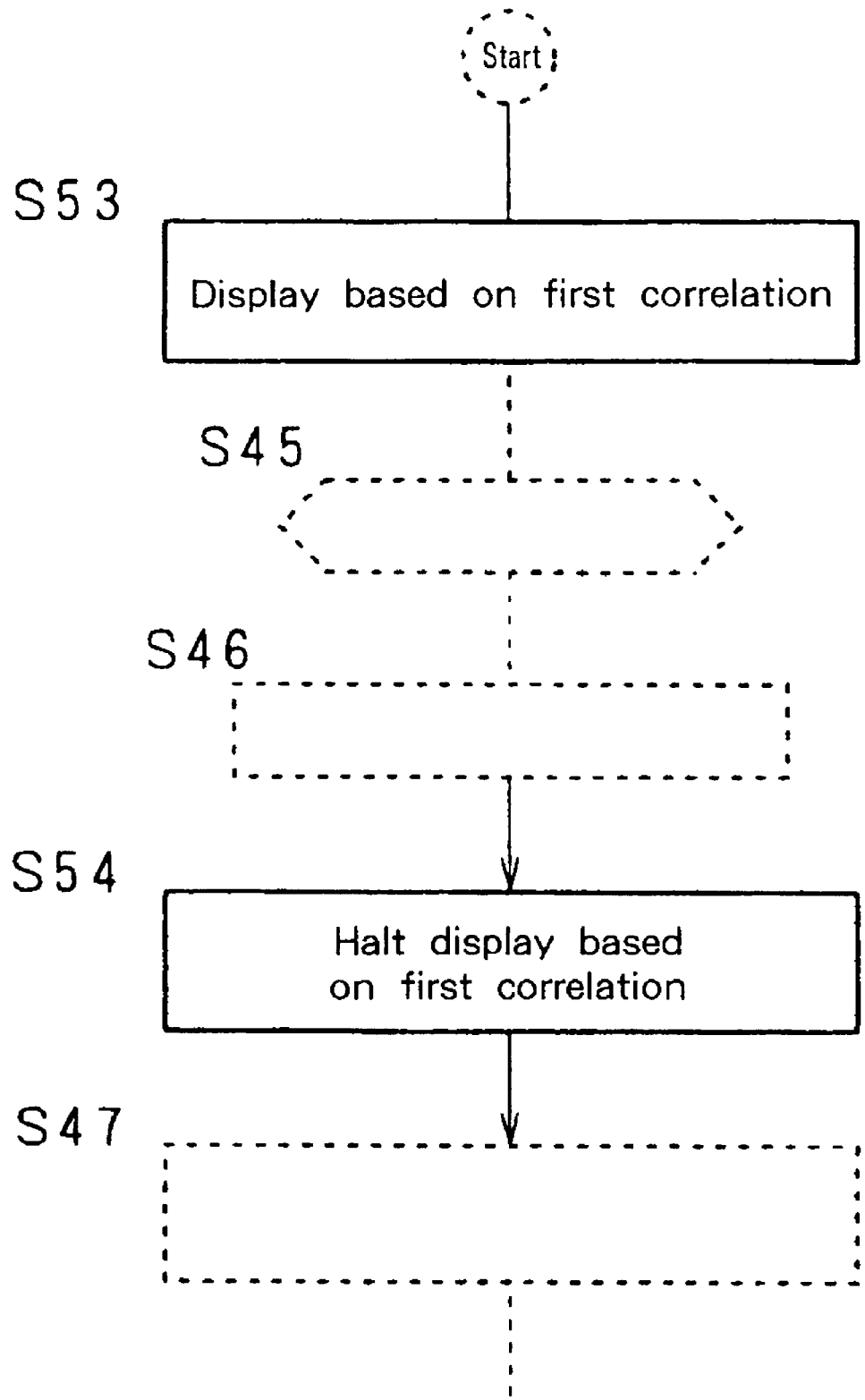
FIG. 9 is a flowchart showing the essential portion of a first partial modification of the flowchart in FIG. 8.

FIG. 9 is a flowchart showing the essential portion of a first partial modification of the flowchart in FIG. 8. Step S53 is inserted before step S45, and step S54 is inserted between steps S46 and S47, while at step S53, the display based on the first correlation is presented. Referring to this display, the user can appropriately select the location whereat contact with the linear contact portion 21 is initiated. At step S54, before the display based on the second correlation at step S47 is presented, the display based on the first correlation is halted. Therefore, since only the display pertinent to the operation performed for the linear contact portion 21 is presented, a user can perform an appropriate operation while experiencing no confusion concerning which correlation is currently effective, the first or the second.

Figure 10:
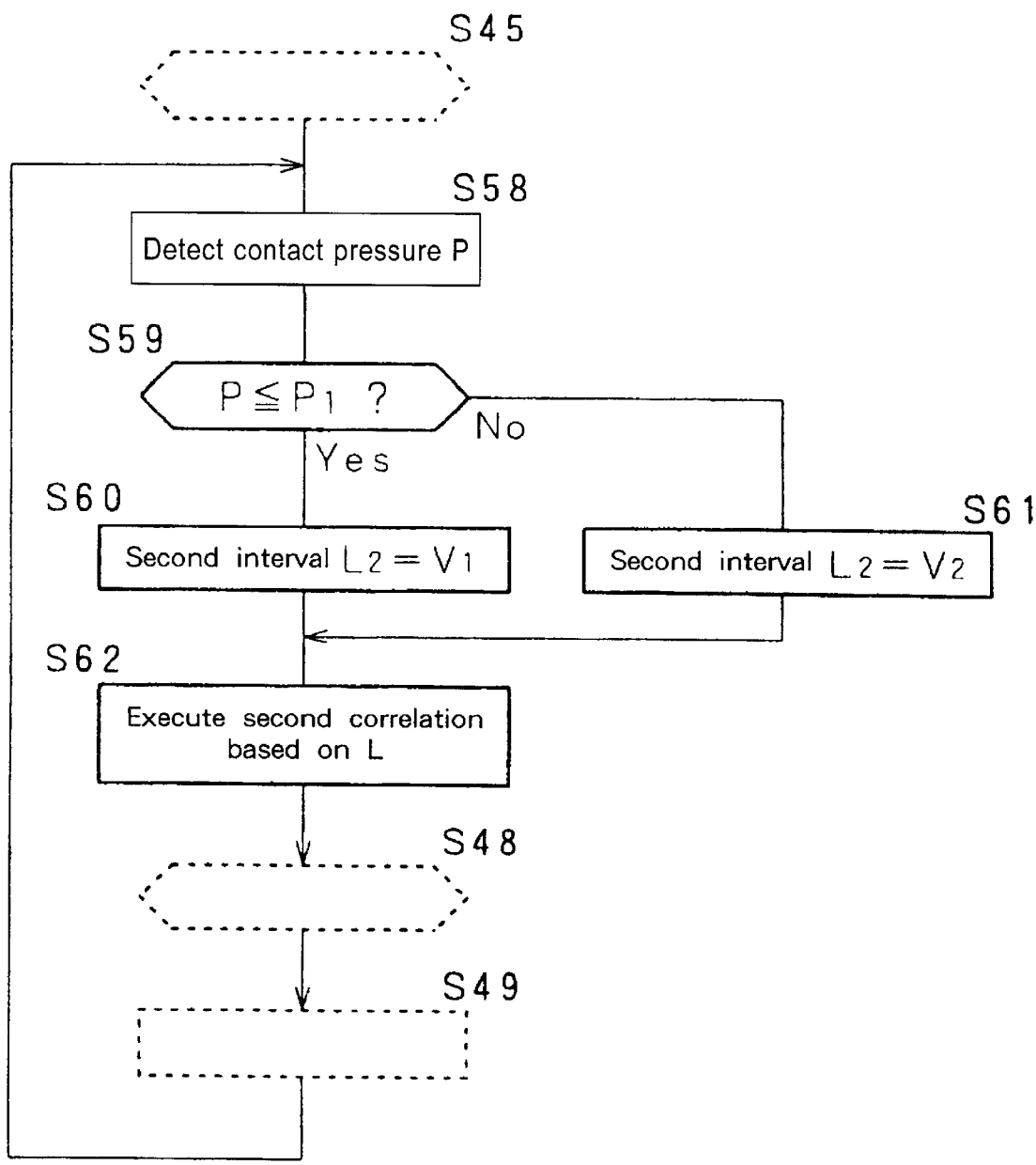
FIG. 10 is a flowchart showing the essential portion of a second partial modification of the flowchart in FIG. 8.

FIG. 10 is a flowchart showing the essential portion of a second partial modification of the flowchart in FIG. 8. steps S58 to S62 are inserted between steps S45 and S48. After the check is performed at step S48, program control returns to step S58, whereat the finger contact pressure P applied to the linear contact portion 21 is detected. At step S57, the finger contact pressure P is compared with a predetermined value P1, and when P shape Type 1 fFlipH0fFlipV0ITxid65536posrelh0posrelv0fLayoutin Cell0fLayoutInCell≦P1, program control advances to step S60, whereas when P>P1, program control is shifted to step S61. At step S60 or S61, the second interval L2 is defined as V1 or V2, where V2 >V1, and program control advances to step S62. At step S62, the second correlation is performed based on the interval L2 that is set at step S61 or S62. When a user forcefully depresses the linear contact portion 21 with a finger, the length of the input object in the setting ordered range, which occupies the linear contact portion 21, is increased, and the target input object can be easily selected.

Figure 11:
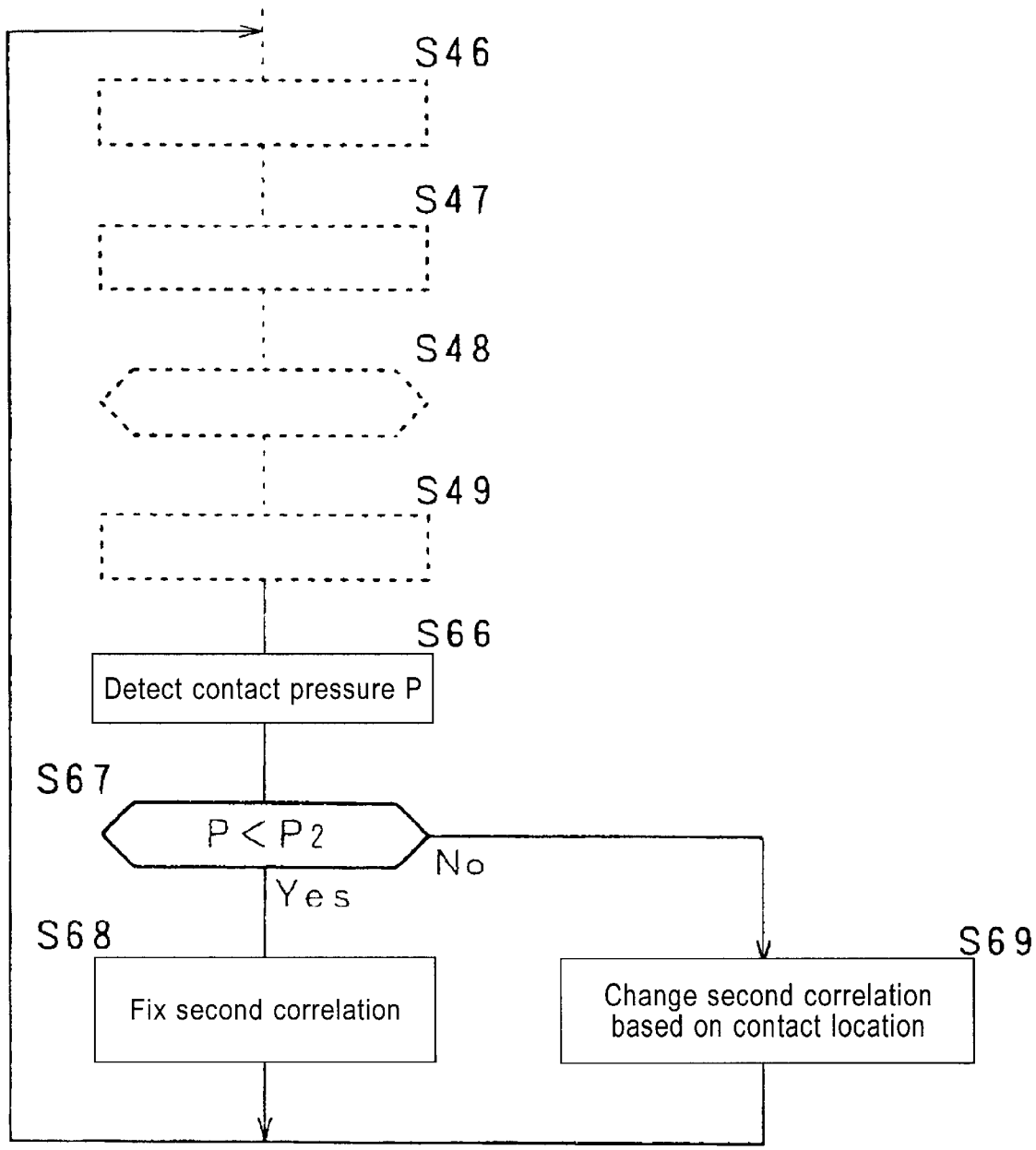
FIG. 11 is a flowchart showing the essential portion of a third partial modification of the flowchart in FIG. 8.

FIG. 11 is a flowchart showing the essential portion of a third partial modification of the flowchart in FIG. 8. Steps S66 to S69 are inserted following step S49, and following the execution of steps S68 and S69, program control returns to step S46. At step S66, the finger contact pressure applied to the linear contact portion 21 is detected, and at step S67, the contact pressure P is compared with a predetermined value P2. When P<P2, program control advances to step S68, but when P≧P2, program control is shifted to step S69. At step S68, the second correlation is fixed. That is, although a finger is being slid along the linear contact portion 21 during the finger contact period, the input objects continue to be allocated to the individual locations on the linear contact portion 21 as they were in accordance with the second correlation. At step S69, during the finger contact period, as a finger is slid along the linear contact portion 21, the input objects that in accordance with the second correlation were allocated to the individual locations on the linear contact portion 21 are changed, so that the designated input object is correlated with the current finger contact location and the setting order is not changed. As a result, even when the contact start location is biased toward one end of the linear contact portion 21 and the target input object is located nearer that end than the input object corresponding to the contact start location, and when the location corresponding to the target input object is allocated to a location outside the linear contact portion 21 the first time in accordance with the second correlation, by shifting the designated input object the corresponding location can be moved so it is situated inside the linear contact portion 21 and by a contact pressure of P2 or less being applied by the finger as it is slid along the linear contact portion 21 the target input object can be correctly entered.

FIG. 12 is a front view of an information terminal watch 80 on which is mounted, as the bezel 83, the input selector 10 of a finger touch type. The information terminal watch 80 comprises a main body 81, and a wrist band 82, for removably attaching the main body 81 closely around a portion of the wrist of a user, and has a communication function for exchanging data with another terminal using Bluetooth. The main body 81 includes the peripheral bezel 83 and a center liquid crystal display portion 84 that is encircled by the bezel 83 and that is formed of liquid crystal having a predetermined size. It is assumed the information terminal watch 80 is attached to the left wrist, and has a circumferential range that substantially exceeds the distance represented by the right half of the bezel 83, e.g., a clockwise circumferential range extending from scale 12 to scale 7 on the face panel is constituted by the input selector 10 explained while referring to FIGS. 1 to 3. Raised portions 85 are arranged at equal intervals L1 around the bezel 83 within the range allocated for the input selector 10. It should be noted that the raised portions 85 are not always required, as hiragana or alphabetic characters are written at the locations of the raised portions 85 that are correlated by the first correlation. The locations of the input selector 10 to which the first and the last characters in the kana syllabary order or in the alphabetic order are defined as the front end and the rear end. Two input types, i.e., the hiragana character input type and the alphabetic input type, and numerical characters, are prepared for the information terminal watch 80, and numerals 1 to 0 are arranged following the alphabetical characters as an alphabetic and numerical input type. The input type is switched each time a predetermined pressure is applied using a finger to the endmost raised portion 85 on the input selector 10. In FIG. 12, a user attempting to enter "HCT 9" has entered "HCT 10" and is now going to enter "HCT 11". An input location pointer 86 is displayed at the "HCT 11" location.

Figure 13A:
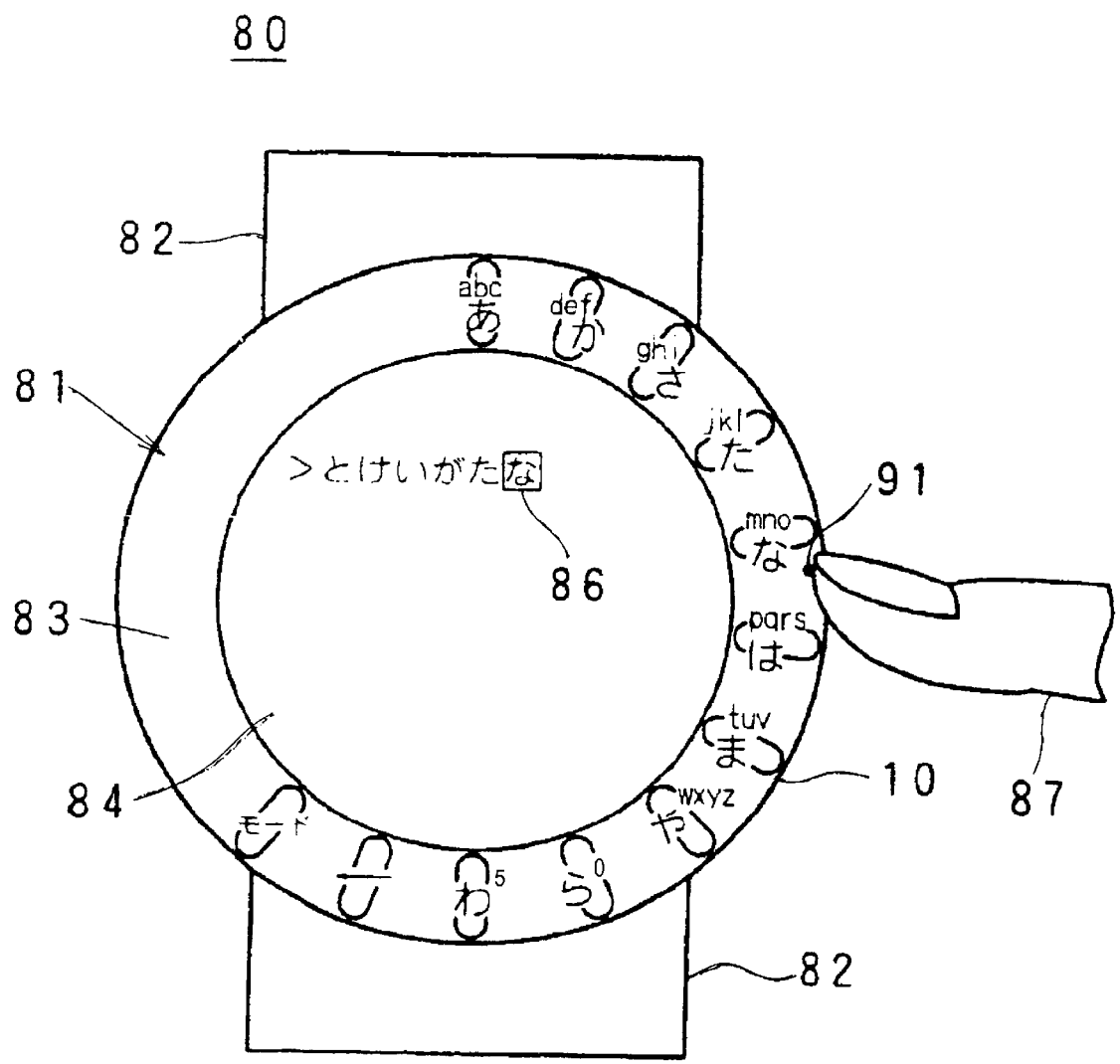
FIGS. 13(a)–13(b) are diagrams showing the state of a liquid crystal display portion when a user enters hiragana characters using the information terminal watch in FIG. 12.
Figure 13B:
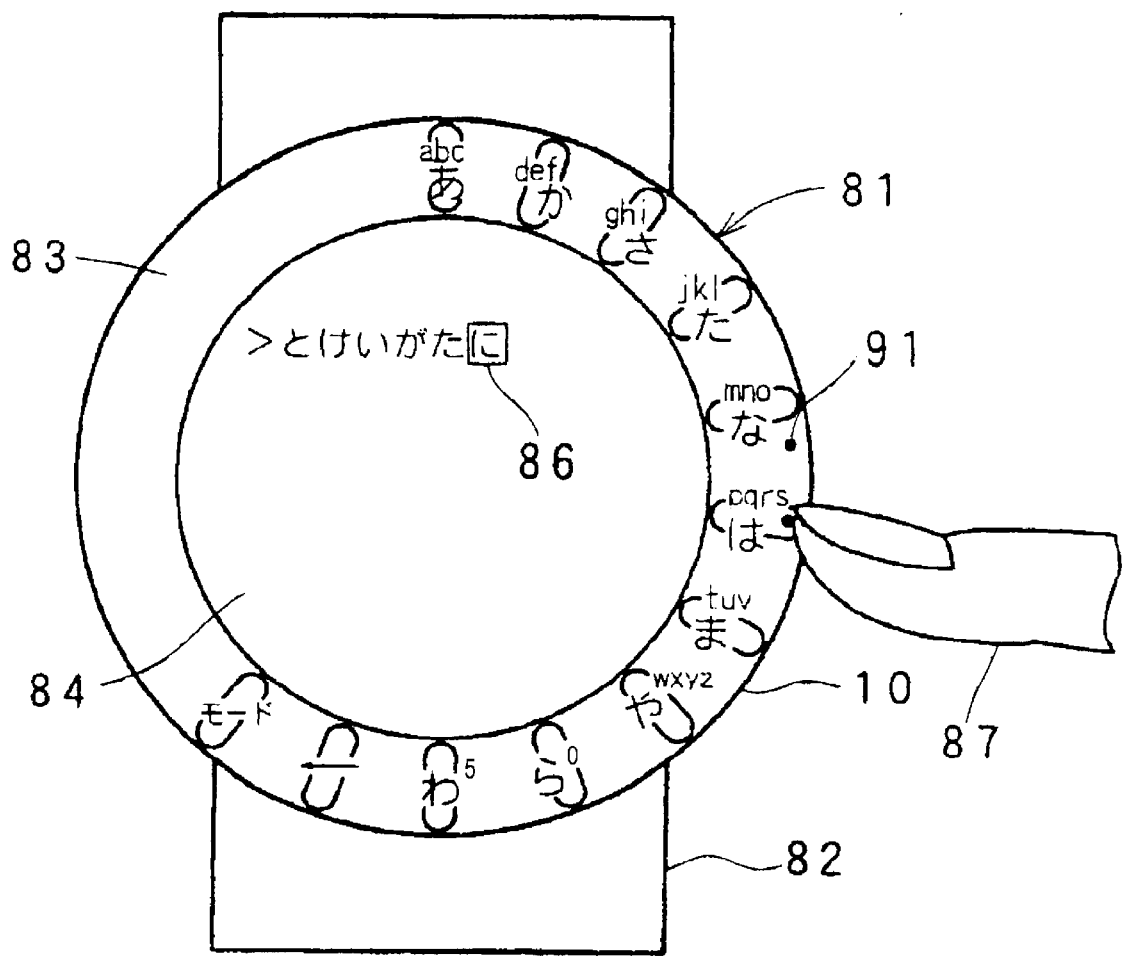

FIG. 13 is a diagram showing the state of the liquid crystal display portion 84 while the user of the information terminal watch 80 in FIG. 12 is entering hiragana characters. It should be noted that for the information terminal watch 80 in FIG. 13 the number for the raised portions 85 is not shown. Since hiragana characters are allocated in the kana syllabary order to locations positioned on the input selector 10 in accordance with the small interval L1, it is normally very difficult, from the beginning, for the user to accurately touch, using a finger 87, the location corresponding to a target hiragana character (the hiragana character that the user currently intends to input to the liquid crystal display portion 84). In FIG. 13, the user has completed the input of "HCT 9" and is going to input "HCT 12". To input "HCT 12", the user aligns the finger 87 with the location of the input selector 10 that the user estimated is the location for "HCT 12". A contact start point 91 is the point whereat the finger 87 first contacts the input selector 10. The hiragana character allocated to the contact start point 91 by the first correlation is echoed back to the input location pointer 86. If the contact start point 91 happens to match the location of "HCT 12", the user can remove the finger 87 from the input selector 10 and input "HCT 12". However, generally, the first point contacted by the finger 87 on the input selector 10 will not match the location of the target hiragana character, and as is shown for example in FIG. 13A, "HCT 13", which is near the target hiragana "HCT 12", is displayed. Since during the finger contact period following the first contact of the input selector 10 made by the finger 87 the correlation of the hiragana characters with the locations of the input selector 10 is changed from the first correlation to the second correlation, in accordance with the second correlation, the hiragana character correlated with the contact start point 91 matches the hiragana character (in this example, "HCT 13") initially correlated with the contact start point 91 in accordance with the first correlation, and for the input selector 10, the interval between the locations allocated for the hiragana characters is set to a greater interval L2. Thus, in accordance with the second correlation, the hiragana characters are aligned at intervals L2 and are allocated in the kana syllabary order to locations within the range bounded by the ends of the input selector 10. In FIG. 13B, the interval L2 corresponds to a range wherein the five hiragana characters are allocated to locations by the first correlation. The user slides the finger 87 along the input selector 10 interval L2 by interval L2 toward the rear end, and accordingly, the input location pointer 86 is changed from "HCT 13" to "HCT 12". When the target hiragana "HCT 12" is echoed back to the input location pointer 86, the user removes the finger 87 from the input selector 10, and "HCT 12" is input to the input location pointer 86.

Figure 14:
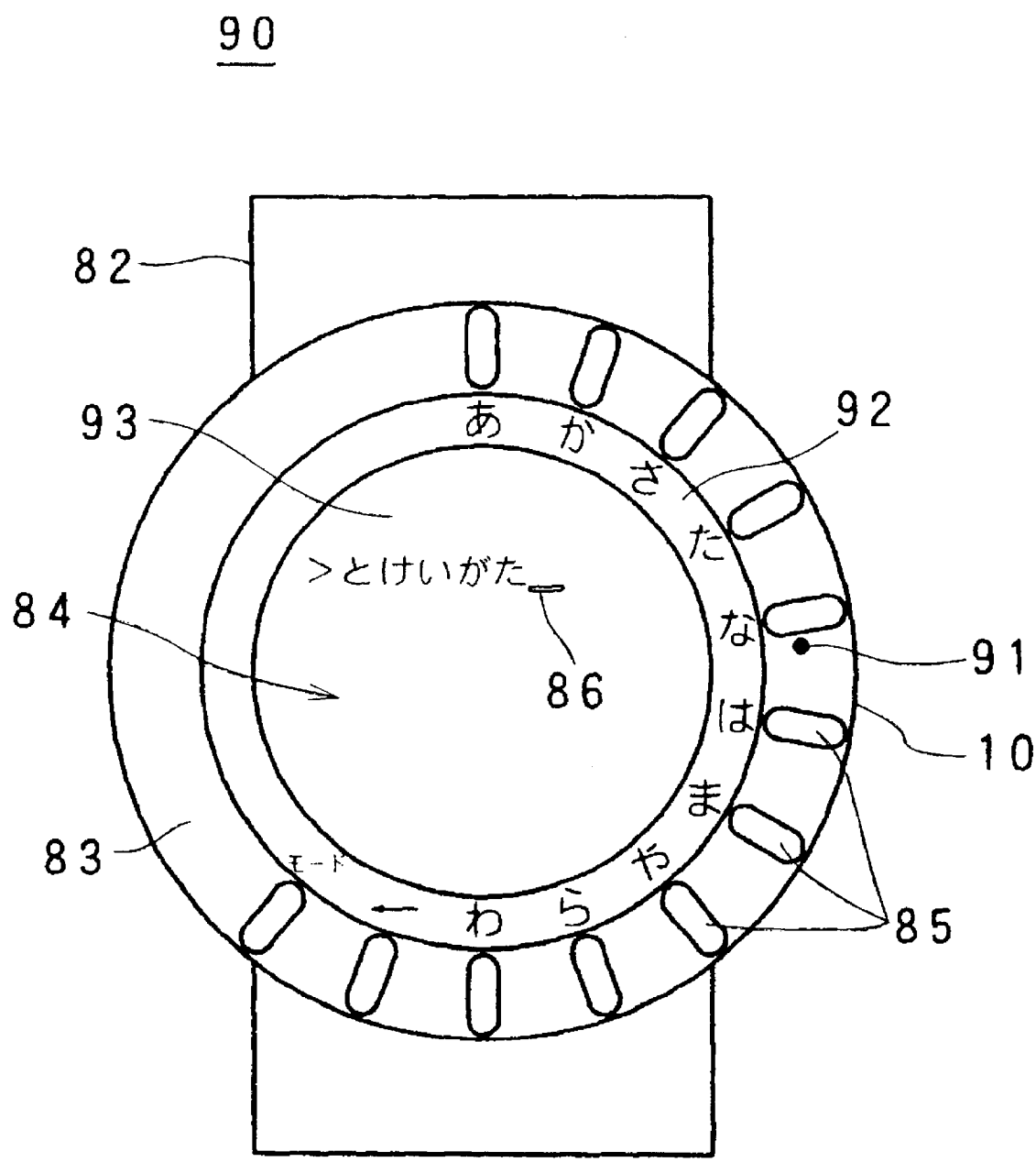
FIG. 14 is a front view of the information terminal watch that presents, on the liquid crystal display portion, a display based on the first correlation.

FIG. 14 is a front view of an information terminal watch 90 that employs the liquid crystal display portion 84 to present the display based on the first correlation. For the information terminal watch 90, the same reference numerals as used for the information terminal watch 80 in FIG. 12 are used to denote corresponding components, and only those components that are different will be described. The liquid crystal display portion 84 includes a circumferential portion 92 extending around the inner face of the bezel 83, and a center circular portion 93 that is encircled by the circumferential portion 92. The information terminal watch 90 differs from the information terminal watch 80 in that the characters allocated to the bezel 83 by the first correlation are not written on the bezel 83. But when the user removes the finger 87 from the input selector 10, relative to the center of the liquid crystal display portion 84, the same hiragana character is displayed at the same angle as on the bezel 83 of the information terminal watch 80 in FIG. 12. It should be noted that in FIG. 14 the display of circumferential portion 92 is shown when the user selects the hiragana input mode. In this case, relative to the center of the liquid crystal display portion 84, in the circumferential portion 92 the same alphabetic characters are also displayed at the same angle as on the bezel 83 of the information terminal watch 80 in FIG. 12.

Figure 15A:
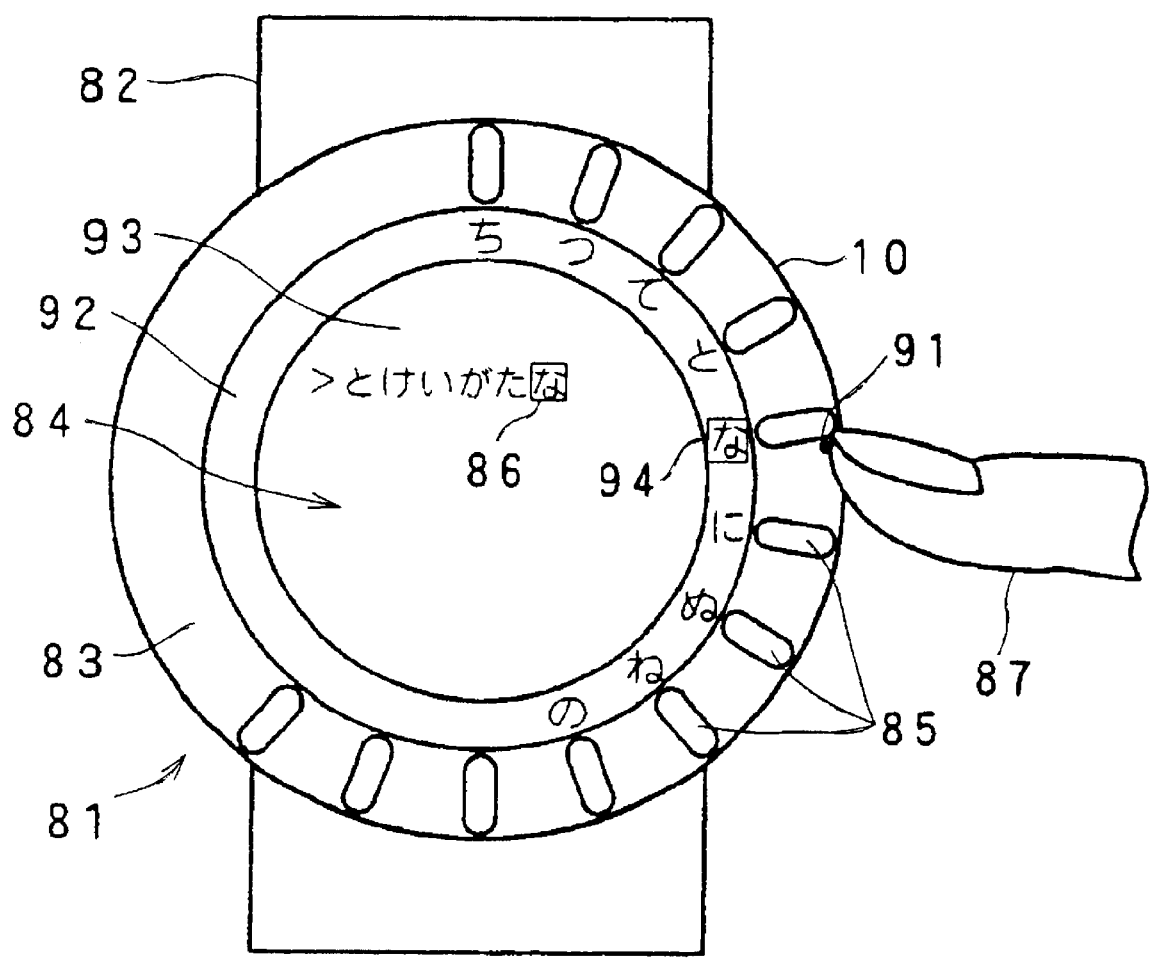
FIGS. 15(a)–15(b) are diagrams showing the state of the liquid crystal display portion when the user enters hiragana characters using the information terminal watch in FIG. 14.
Figure 15B:
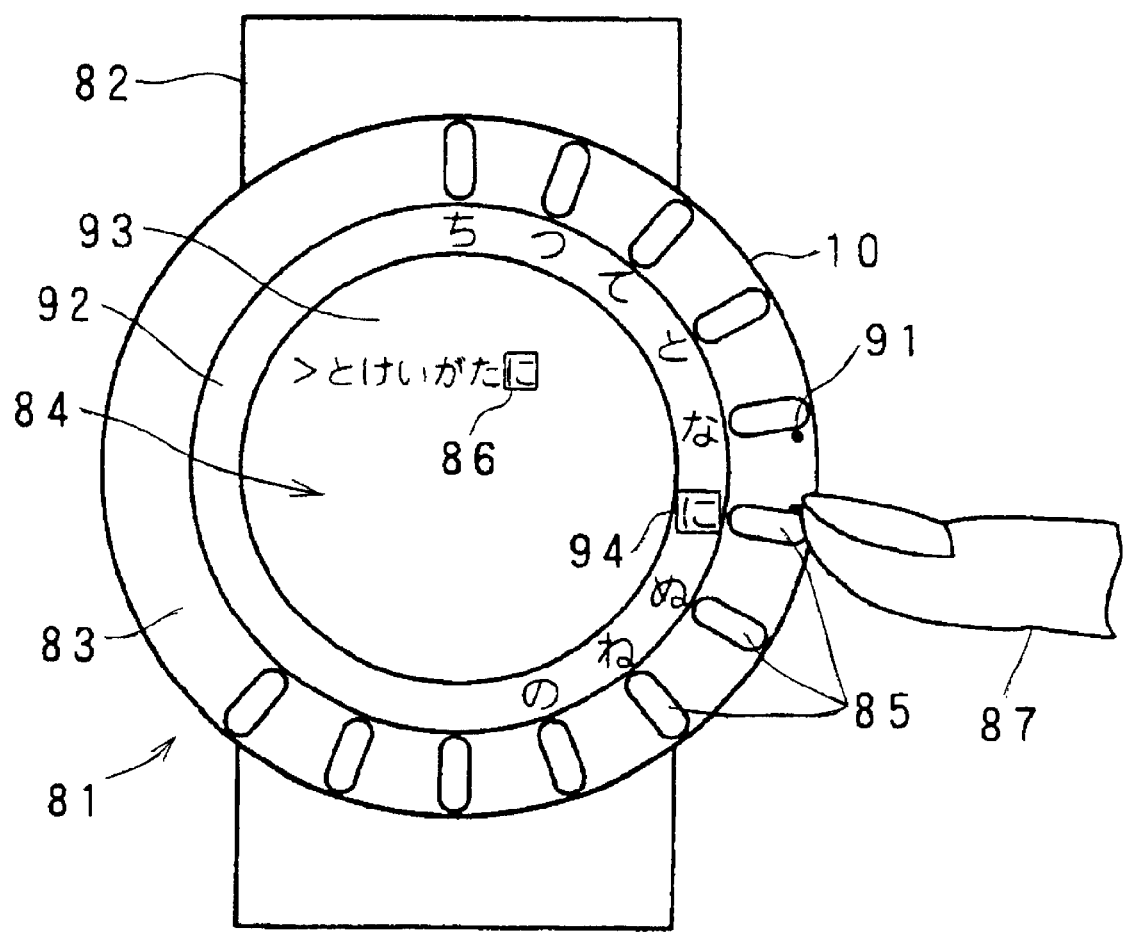

FIG. 15 is a diagram showing the state of the liquid crystal display portion 84 of the information terminal watch 90 in FIG. 14 when the user inputs hiragana characters. Since hiragana characters are allocated in the kana syllabary order to locations positioned on the input selector 10 in accordance with the small interval L1, it is normally very difficult, from the beginning, for the user to accurately touch, using the finger 87, the location corresponding to a target hiragana character (the hiragana character that the user currently intends to input to the liquid crystal display portion 84). In FIG. 15, the user has completed the input of "HCT 9" and is going to input "HCT 12". To input "HCT 12", the user aligns the finger 87 with the location of the input selector 10 that the user estimated is the location for "HCT 12". A contact start point 91 is the point whereat the finger 87 first contacts the input selector 10. The hiragana character allocated to the contact start point 91 by the first correlation is echoed back to the input location pointer 86. If the contact start point 91 happens to match the location of "HCT 12", the user can remove the finger 87 from the input selector 10 and input "HCT 12". However, generally, the first point contacted by the finger 87 on the input selector 10 will not match the location of the target hiragana character, and as is shown in FIG. 15A, "HCT 13", which is near the target hiragana "HCT 12", is displayed. Since during the finger contact period following the first contact of the input selector 10 made by the finger 87 the correlation of the hiragana characters with the locations of the input selector 10 is changed from the first correlation to the second correlation, in accordance with the second correlation, the hiragana character correlated with the contact start point 91 matches the hiragana character (in this example, "HCT 13") initially correlated with the contact start point 91 in accordance with the first correlation, and for the input selector 10, the interval between the locations allocated for the hiragana characters is set to a greater interval L2. Thus, in accordance with the second correlation, the hiragana characters are aligned at intervals L2 and are allocated in the kana syllabary order to locations within the range bounded by the ends of the input selector 10. In FIG. 15B, the interval L2 corresponds to a range wherein the three hiragana characters are allocated to locations by the first correlation. The user slides the finger 87 along the input selector 10 interval L2 by interval L2 toward the rear end, and accordingly, the input location pointer 86 is changed from "HCT 13" to "HCT 12". When the target hiragana "HCT 12" is echoed back to the input location pointer 86, the user removes the finger 87 from the input selector 10, and "HCT 12" is input to the input location pointer 86.

Figure 16A:
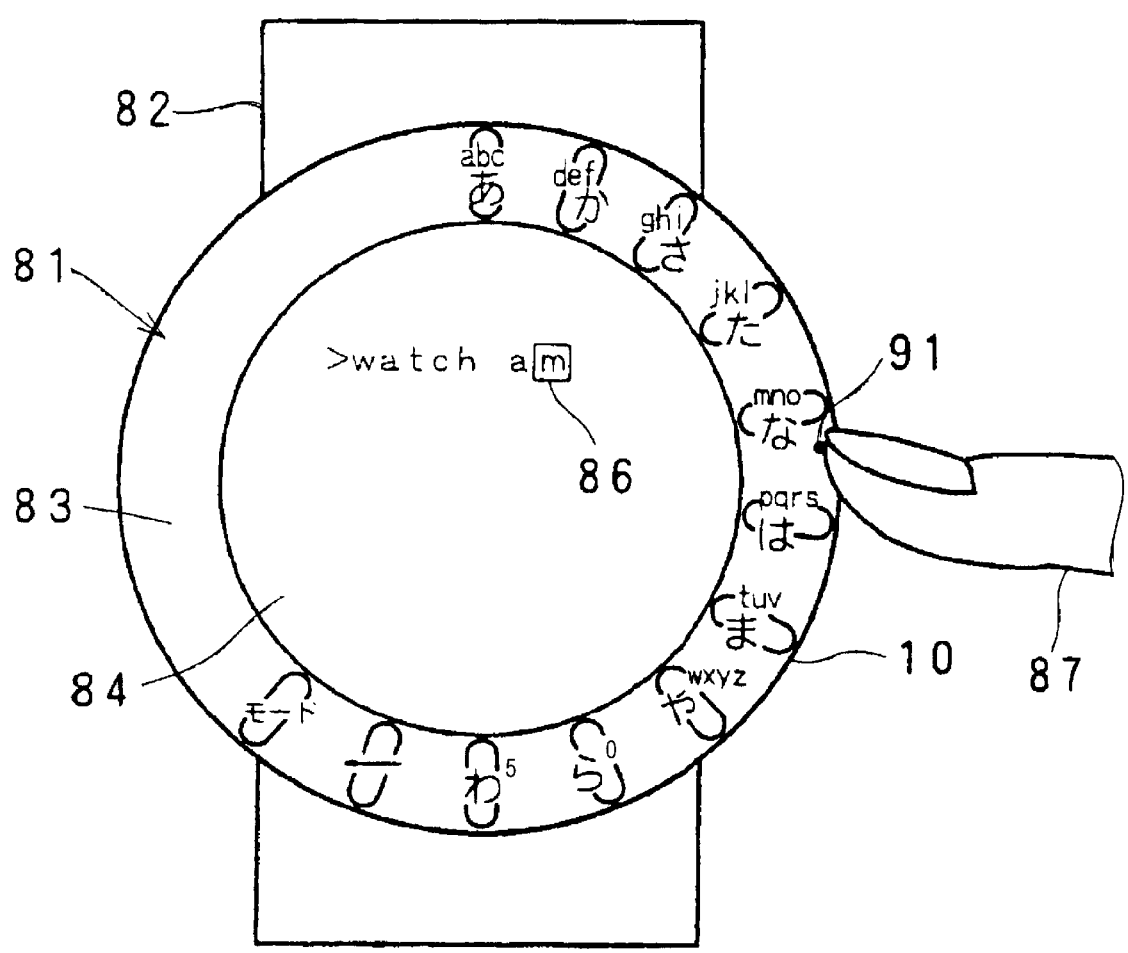
FIGS. 16(a)–16(b) are diagrams showing the state of the liquid crystal display portion when the user enters alphabetic characters using the information terminal watch in FIG. 12.
Figure 16B:
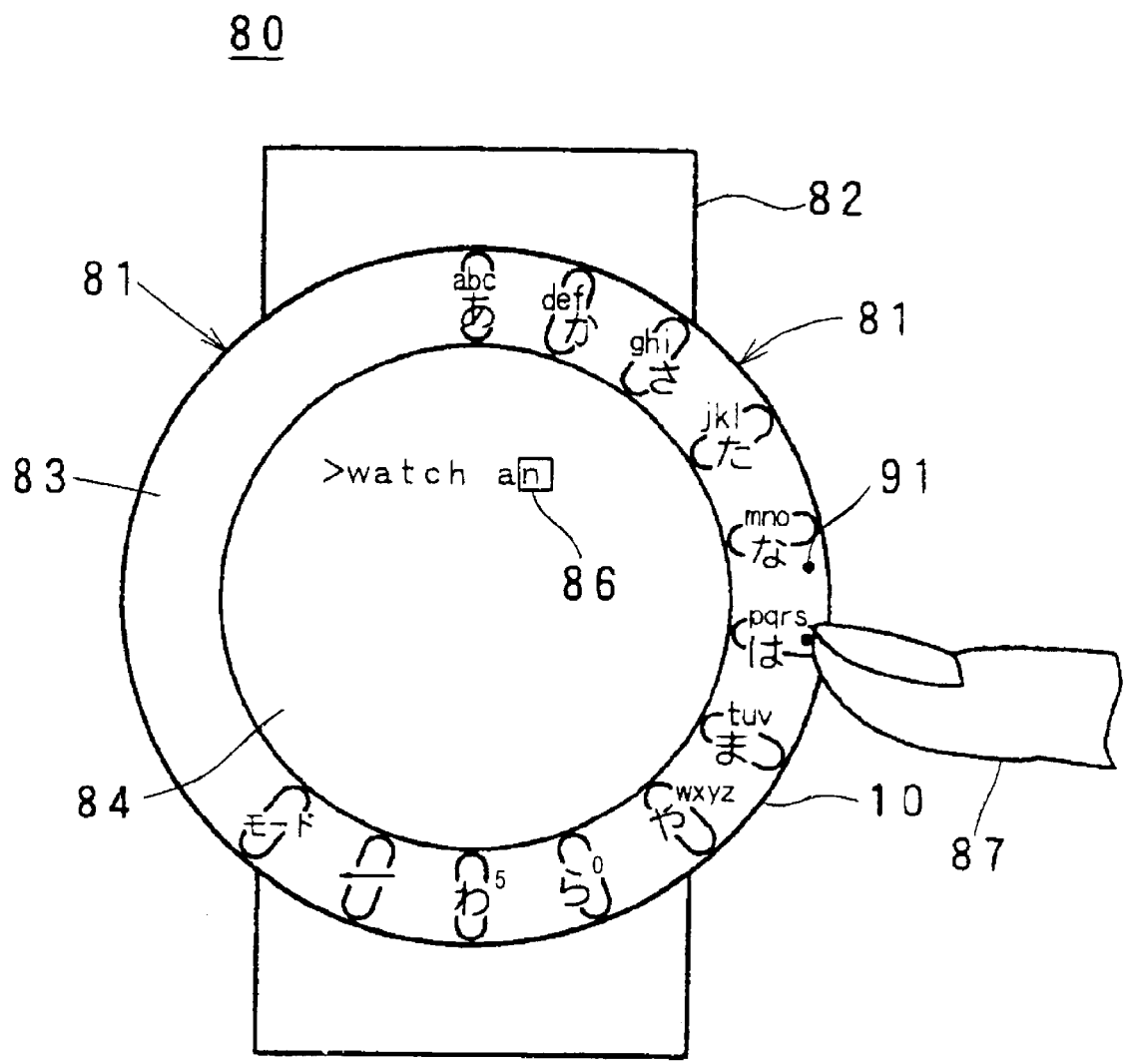

FIG. 16 is a diagram showing the state of the liquid crystal display portion 84 of the information terminal watch 90 in FIG. 12 when the user inputs alphabetic characters. It should be noted that for the information terminal watch 80 in FIG. 16 the number for the raised portions 85 is not shown. Since alphabetic characters are allocated in the alphabetic order to locations positioned on the input selector 10 in accordance with the small interval L1, it is normally very difficult, from the beginning, for the user to accurately touch, using the finger 87, the location corresponding to a target alphabetic character (the alphabetic character that the user currently intends to input to the liquid crystal display portion 84). In FIG. 16, the user has completed the input of "watch a" and is going to input "n". To input "n", the user aligns the finger 87 with the location of the input selector 10 that the user estimated is the location for "n". A contact start point 91 is the point whereat the finger 87 first contacts the input selector 10. The alphabetic character allocated to the contact start point 91 by the first correlation is echoed back to the input location pointer 86. If the contact start point 91 happens to match the location of "n", the user can remove the finger 87 from the input selector 10 and input "n". However, generally, the first point contacted by the finger 87 on the input selector 10 will not match the location of the target alphabetic character, and as is shown in FIG. 16A, "m", which is near the target alphabet "n", is displayed. Since during the finger contact period following the first contact of the input selector 10 made by the finger 87 the correlation of the alphabetic characters with the locations of the input selector 10 is changed from the first correlation to the second correlation, in accordance with the second correlation, the alphabetic character correlated with the contact start point 91 matches the alphabetic character (in this example, "m") initially correlated with the contact start point 91 in accordance with the first correlation, and for the input selector 10, the interval between the locations allocated for the alphabetic characters is set to a greater interval L2. Thus, in accordance with the second correlation, the alphabetic characters are aligned at intervals L2 and are allocated in the alphabetic order to locations within the range bounded by the ends of the input selector 10. In FIG. 16B, the interval L2 corresponds to a range wherein the three alphabetic characters are allocated to locations by the first correlation. The user slides the finger 87 along the input selector 10 interval L2 by interval L2 toward the rear end, and accordingly, the input location pointer 86 is changed from "m" to "n". When the target alphabet "n" is echoed back to the input location pointer 86, the user removes the finger 87 from the input selector 10, and "n" is input to the input location pointer 86.

Figure 17:
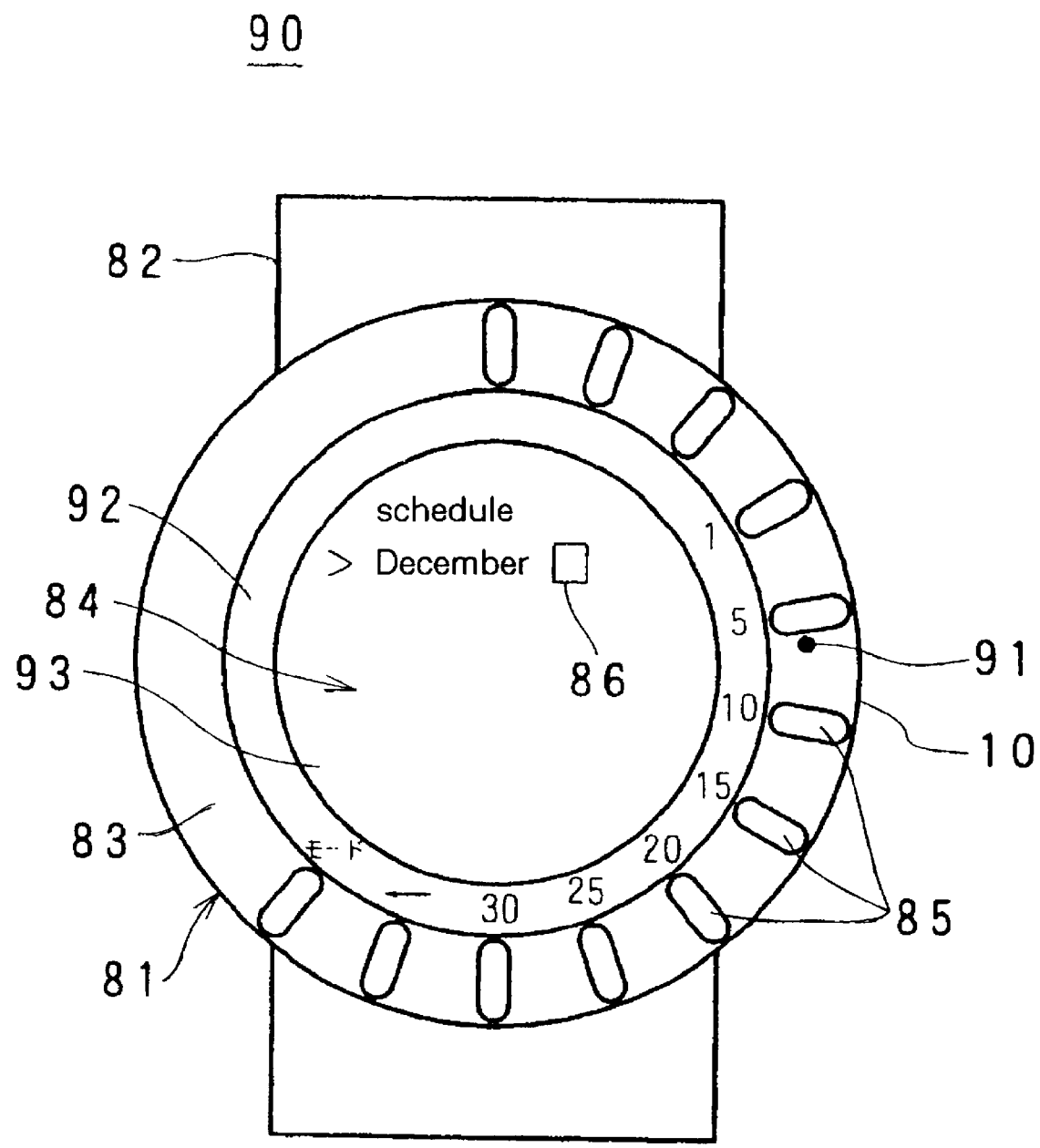
FIG. 17 is a diagram showing the state of the liquid crystal display portion when the user starts to enter a scheduled date using the information terminal watch in FIG. 14.

FIG. 17 is a diagram showing the state of the liquid crystal display portion 84 when the user employs the information terminal watch 90 in FIG. 14 to begin the entry of a date for a schedule. In FIG. 17, the user has touched, using the finger 87, the mode at the rear end of the input selector 10 to enter the mode selection process during which the schedule is selected and the month is entered, and is currently, going to enter the day. In the circumferential portion 92, in accordance with the first correlation concerning the day, numbers 1 to 31 are allocated in order to the locations on the input selector 10, and only the integer times 1 and 5 are displayed as specific allocated values at corresponding locations in the circumferential portion 92 along the inner circumference of the bezel 83.

Figure 18A:
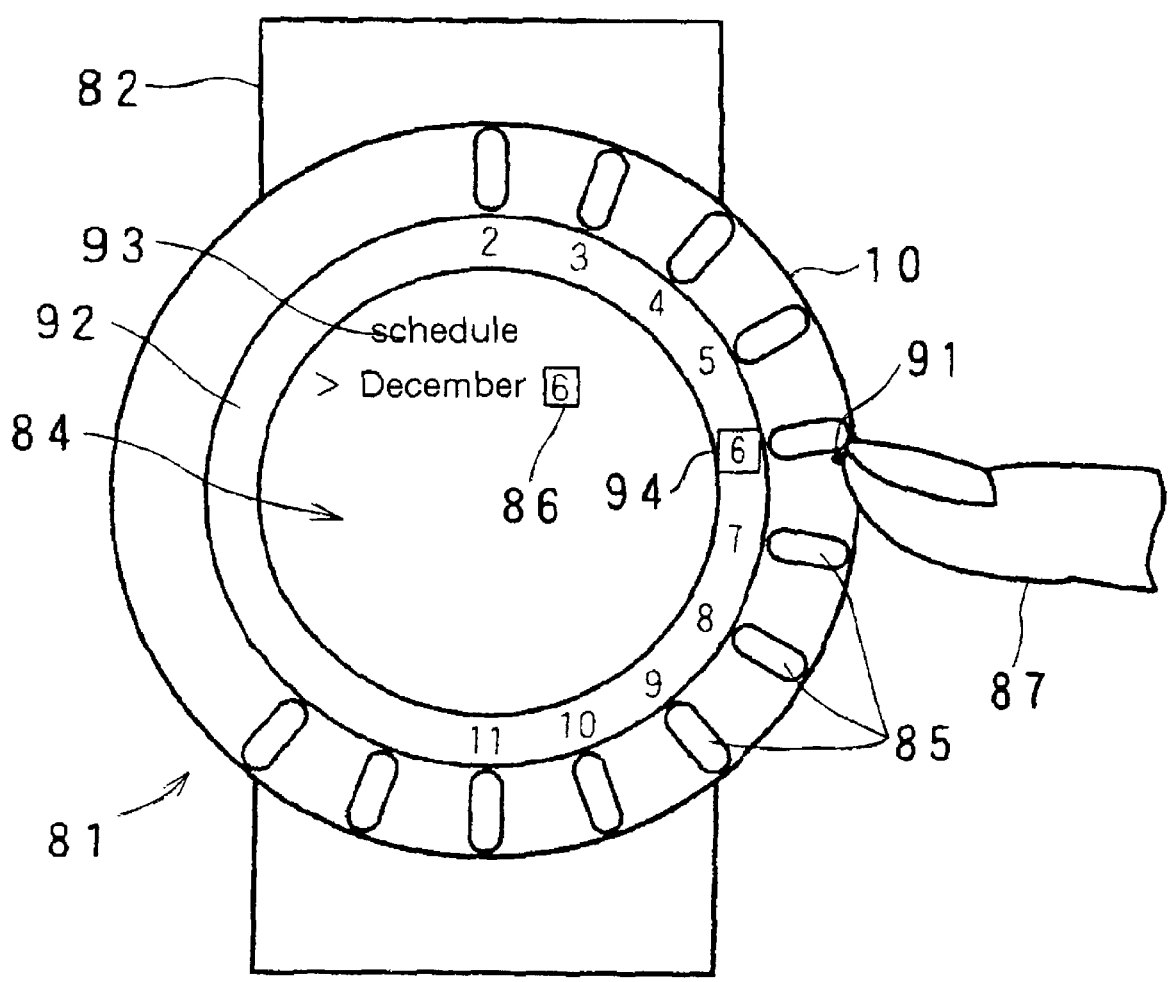
FIGS. 18(a)–18(b) are diagrams showing the state of the liquid crystal display portion when the user contacts, with a finger, the input selector in the state of the information terminal watch shown in FIG. 17.
Figure 18B:
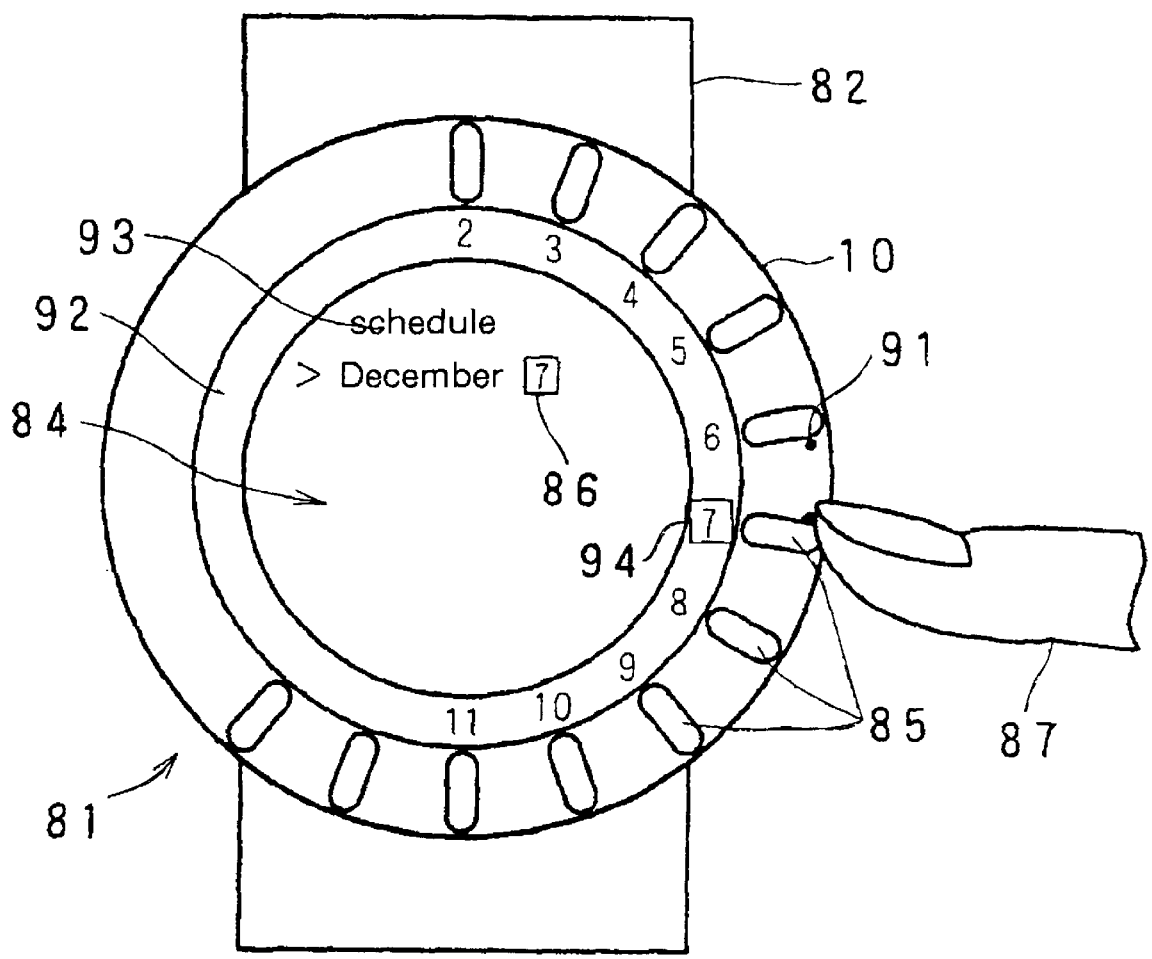

FIG. 18 is a diagram showing the state of the liquid crystal display portion 84 when the finger 87 touches the input selector 10 in the state in which the information terminal watch 90 is operated in FIG. 17. As soon as the finger 87 touches the contact start point 91, the display in FIG. 17 in the circumferential portion 92 is changed to that in FIG. 18A. The numerical values that correspond to the locations on the input selector 10 in accordance with the second correlation are displayed in the circumferential portion 92 in FIG. 18A. That is, "6" is the numerical value allocated to the contact start point 91 in accordance with the first correlation, and this allocation is unchanged for the second correlation. Further, based on the second correlation, the interval between the locations on the input selector 10 to which the numerical values are allocated is defined as the interval L2 that corresponds to five times the interval L1 that is used by the first correlation for the circumferential portion 92 of the information terminal watch 90 in FIG. 17. The numerical values are allocated in the ascending order to the locations sized in accordance with the large interval L2 in the range bounded by the ends of the input selector 10. In FIG. 18, the user is to input "7" as the scheduled day. To enter "7", the user aims the finger 87 at the location on the input selector 10 whereat the user estimated "7" is located. However, the user failed to contact with the finger 87 the location allocated in accordance with the first correlation for "7", and instead, the finger 87 seems to have touched the contact start point 91 that is correlated with "6" and is near "7". The numerical value that is correlated with the contact start point 91 in accordance with the first correlation is echoed back to the input location pointer 86 in the circular portion 93. Further, in the circumferential portion 92, a highlighted display 94 is provided for a numerical value that is allocated, in accordance with the currently effective second correlation, to the location on the input selector 10 currently touched by the finger 87. Since during the finger contact period following the initial contact of the input selector 10 by the finger 87, the first correlation for the numerical values for the input selector 10 is changed to the second correlation, as is shown in FIG. 15B, the user slides the finger 87 along the input selector 10 toward the rear end interval L2 by interval L2, and accordingly, the figure echoed back to at the input location pointer 86 is changed from "6" to the target numerical value "7". At this time, the finger 87 is removed from the input selector 10, and "7" is input to the input location pointer 86. Since the correlation that is determined to be effective for the current contact operation for the input selector 10 is displayed in the circumferential portion 92 of the information terminal watch 90, without experiencing any confusion, the user can smoothly manipulation required for the input selector 10.

Figure 19:
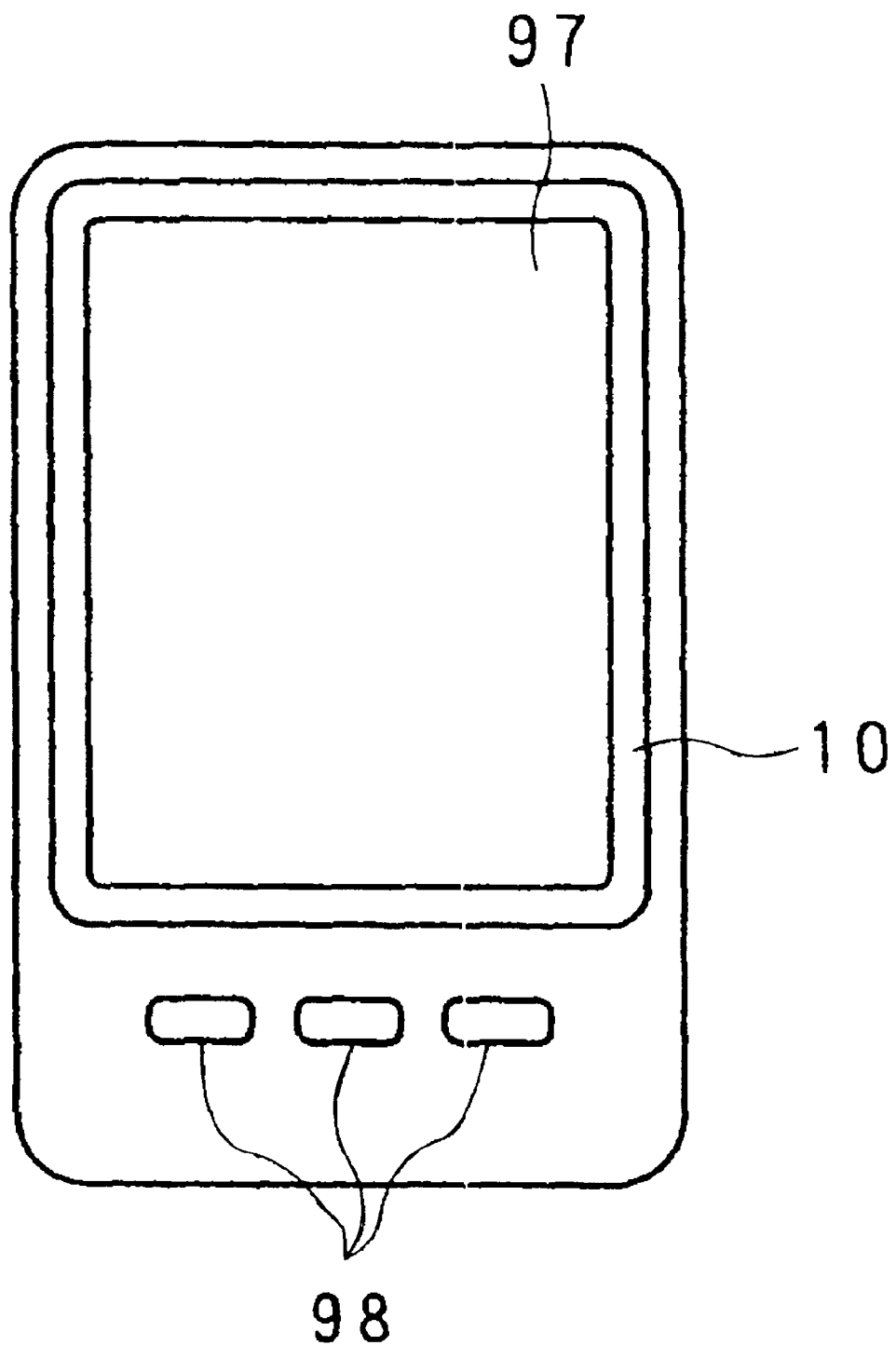
FIG. 19 is a front view of a PDA or a handy phone wherein the input selector of a finger touch type is mounted.

FIG. 19 is a front view of a PDA or handy phone 96 wherein the input selector 10 of a finger touch type is mounted. A rectangular liquid crystal display panel 97 for displaying various information is provided on the front of the PDA or handy phone 96, and a predetermined number of operating buttons or keys 98 liquid crystal display panel 97. The input selector 10 is so provided that it encloses the peripheral sides of the rectangle. The user selects a desired input object by using a finger to contact the input selector 10 and by sliding the finger along it.

Figure 20:
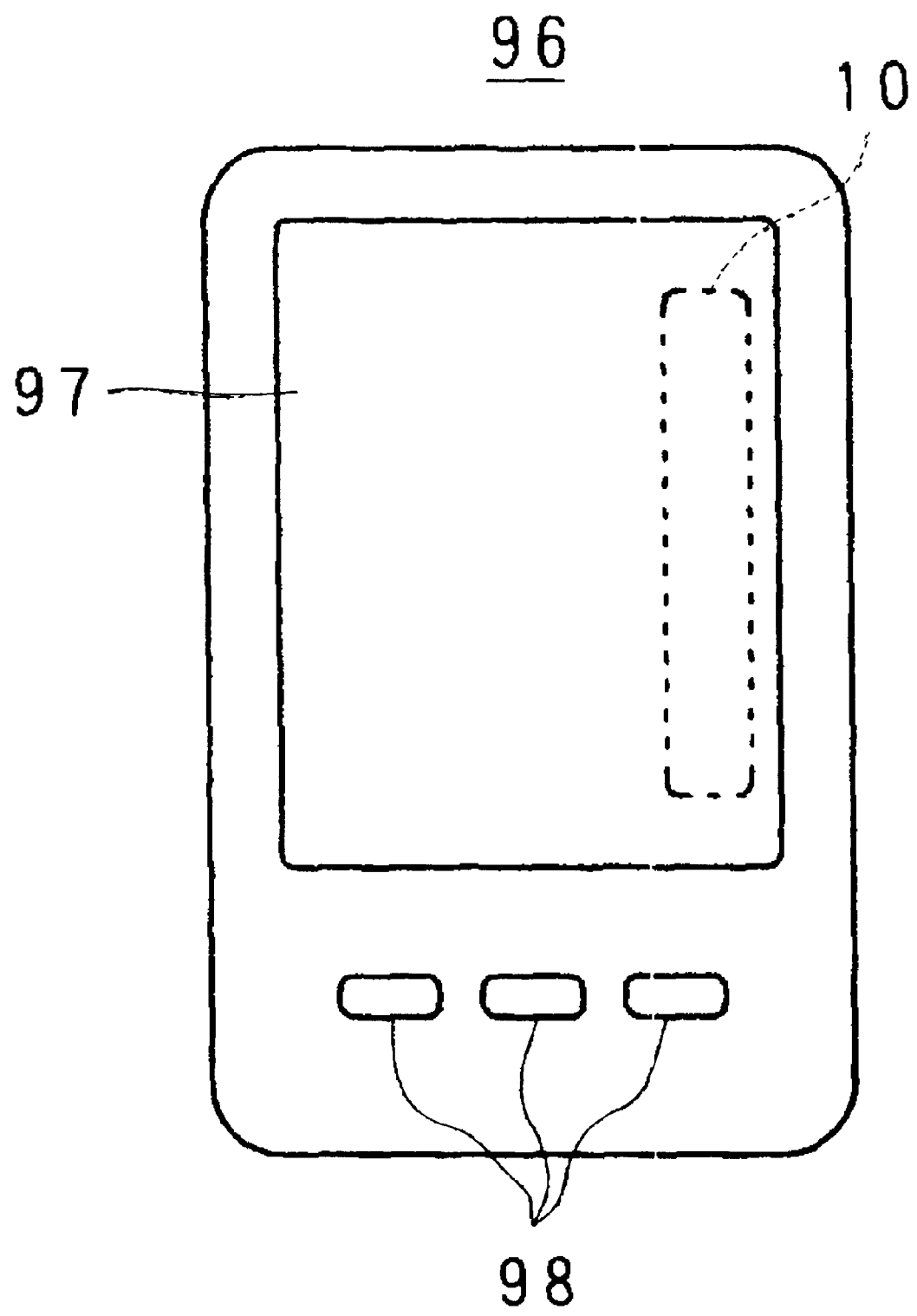
FIG. 20 is a diagram showing a modification of the PDA or the handy phone in FIG. 19.

FIG. 20 is a diagram showing a modification of the PDA or handy phone 96 in FIG. 19. For the PDA or handy phone 96 in FIG. 20, the input selector 10 of a finger touch type is linearly positioned along the right side of the liquid crystal display panel 97. The user selects a desired input object by using a finger to contact the input selector 10 in the liquid crystal display panel 97 and by sliding the finger along the selector 10.

In summary, according to the first correlation, an input selector 10 of a finger touch type is divided using distances L1 in the direction in which the input selector 10 is extended, and all hiragana characters are allocated in the kana syllabary order to the thus obtained segments. A user aims a finger and contacts a location that based on the first correlation is allocated to a desired hiragana character. Accordingly, the input selector 10 is changed to the second correlation, and in accordance with the second correlation, the input selector 10 is divided by distances L2 that are properly greater than the distances L1 in the direction in which the input selector 10 is extended, and the hiragana characters are allocated to the larger segments. In this case, the hiragana character that is allocated to the contact start location in accordance with the first correlation is maintained at the same location on the input selector 10 even after the switch to the second correlation has been effected. When the user slides the finger along the input selector 10 to a target hiragana character, and removes the finger, the target hiragana character is input.

| Hiragana Characters Table |
|---|
| 1.あ |
| 2.ん |
| 3.ぬ |
| 4.き |
| 5.かきくけこ |
| 6.く |
| 7.の |
| 8.ふ |
| 9.とけいがた |
| 10.よいいが |
| 11.た |
| 12.に |
| 13.ぬ |

It is to be understood that the provided illustrative examples are by no means exhaustive of the many possible uses for my invention.

From the foregoing description, one skilled in the art can easily ascertain the essential characteristics of this invention and, without departing from the spirit and scope thereof, can make various changes and modifications of the invention to adapt it to various usages and conditions.

It is to be understood that the present invention is not limited to the embodiments described above, but encompasses any and all embodiments within the scope of the following claims:

What is claimed is:

1. An input object selector comprising:

a linear contact portion, which is linearly extended within a predetermined range, that a user can contact with a finger and along which said user can slide said finger, in the direction in which said linear contact portion is extended, to an arbitrary location;

a contact detector, for detecting the contact of said linear contact portion by said finger and identifying said location that is contacted;

first correlation unit, for correlating, in a predetermined order, multiple input objects with locations arranged at first intervals in said direction in which said linear contact portion is extended;

range detector for detecting an order range wherein an input object, which is correlated by said first correlation with a start location whereat said finger first contacted said linear contact portion, is included, and in accordance with said predetermined order multiple input objects are included;

second correlation unit for correlating, in accordance with said predetermined order, said input objects within said order range with locations along said linear contact portion that are arranged at second intervals that are greater than said first intervals;

correlated input object detection unit for detecting, when said location whereat said finger contacts said linear contact portion is changed during a period extending from when said finger first contacted said linear contact portion until said contact was removed, an input object that is correlated by said second correlation with a location along said linear contact portion currently contacted by said finger; and input determination unit for determining as current user input said input object that is detected at a contact end location by said input object detection unit.

2. The input object selector according to claim 1, further comprising:

first display device for displaying said first correlation.

3. The input object selector according to claim 1, further comprising:

second display device for displaying said second correlation during said finger contact period.

4. The input object selector according to claim 1, further comprising:

first display device for displaying said first correlation, and for halting the display operation during said finger contact period.

5. The input object selector according to claim 1, further comprising:

a first pressure detector for detecting first and second pressure ranges that, relative to a linear contact portion, differ in finger contact pressure; and an interval controller for more greatly increasing said second intervals when said finger contact pressure relative to said linear contact portion falls in said first pressure range during said finger contact period, than when said finger contact pressure falls in said second pressure range.

6. The input object selector according to claim 1, further comprising:

pressure detector for detecting whether a finger contact pressure relative to said linear contact portion is equal to or greater than a predetermined value, or smaller than said predetermined value; and interval controller for changing said second intervals each time, during said finger contact period, said finger contact pressure relative to said linear contact portion is changed from less than said predetermined value to equal to or greater than said predetermined value.

7. The input object selector according to claim 5, further comprising:
- a second pressure detector for detecting third and fourth pressure ranges that differ in finger contact pressure relative to a linear contact portion; and
- an input object location moving device for maintaining, when said finger contact pressure relative to said linear contact portion falls in said third pressure range during said finger contact period, the locations of said linear contact portion that are correlated with said input objects by said second correlation, even though said finger is slid along said linear contact portion, and for moving, when said finger contact pressure falls in said fourth pressure range, said locations of said linear contact portion, which are correlated with said input objects by said second correlation, in the direction in which said finger is slid toward said linear contact portion.

8. The input object selector according to claim 1, further includes recessed and raised portions, wherein said linear contact portion, recessed portions and raised portions are formed at predetermined intervals.

9. The input object selector according to claim 1, further comprising:
- processor for performing a process other than the selection of an input object when, during said finger contact period, said finger is slid along said linear contact portion from said contact start location a distance equal to or greater than a predetermined length.

10. The input object selector according to claim 1, wherein said input objects are either one of characters or menu items.

11. A handy information device comprising:
an input object selector, said input object selector further comprises:
- a linear contact portion, which is linearly extended within a predetermined range, that a user can contact with a finger and along which said user can slide said finger, in the direction in which said linear contact portion is extended, to an arbitrary location;
- a contact detector, for detecting the contact of said linear contact portion by said finger and identifying said location that is contacted;
- first correlation unit, for correlating, in a predetermined order, multiple input objects with locations arranged at first intervals in said direction in which said linear contact portion is extended;
- range detector for detecting an order range wherein an input object, which is correlated by said first correlation with a start location whereat said finger first contacted said linear contact portion, is included, and in accordance with said predetermined order multiple input objects are included;
- second correlation unit for correlating, in accordance with said predetermined order, said input objects within said order range with locations along said linear contact portion that are arranged at second intervals that are greater than said first intervals;
- correlated input object detection unit for detecting, when said location whereat said finger contacts said linear contact portion is changed during a period extending from when said finger first contacted said linear contact portion until said contact was removed, an input object that is correlated by said second correlation with a location along said linear contact portion currently contacted by said finger; and input determination unit for determining as current user input said input object that is detected at a contact end location by said input object detection unit.

12. A wrist information device comprising:
an input object selector, said input object selector further comprises:
- a linear contact portion, which is linearly extended within a predetermined range, that a user can contact with a finger and along which said user can slide said finger, in the direction in which said linear contact portion is extended, to an arbitrary location;
- a contact detector, for detecting the contact of said linear contact portion by said finger and identifying said location that is contacted;
- first correlation unit, for correlating, in a predetermined order, multiple input objects with locations arranged at first intervals in said direction in which said linear contact portion is extended;
- range detector for detecting an order range wherein an input object, which is correlated by said first correlation with a start location whereat said finger first contacted said linear contact portion, is included, and in accordance with said predetermined order multiple input objects are included;
- second correlation unit for correlating, in accordance with said predetermined order, said input objects within said order range with locations along said linear contact portion that are arranged at second intervals that are greater than said first intervals;
- correlated input object detection unit for detecting, when said location whereat said finger contacts said linear contact portion is changed during a period extending from when said finger first contacted said linear contact portion until said contact was removed, an input object that is correlated by said second correlation with a location along said linear contact portion currently contacted by said finger; and
- input determination unit for determining as current user input said input object that is detected at a contact end location by said input object detection unit.

13. The wrist information device according to claim 12, wherein said linear contact portion is provided at the peripheral frame of a liquid crystal display portion.

14. An input object selection method comprising the steps of:
- preparing a linear contact portion, which is linearly extended within a predetermined range, that a user can contact with a finger and along which said user can slide said finger, in the direction in which said linear contact portion is extended, to an arbitrary location, and a contact detector, for detecting the contact of said linear contact portion by said finger and identifying said location that is contacted;
- correlating, in a predetermined order, multiple input objects with locations arranged at first intervals in said direction in which said linear contact portion is extended;
- detecting an order range wherein an input object, which is correlated by said first correlation with a start location whereat said finger first contacted said linear contact portion, is included, and in accordance with said predetermined order multiple input objects are included;

for correlating, in accordance with said predetermined order, said input objects within said order range with locations along said linear contact portion that are arranged at second intervals that are greater than said first intervals;

detecting, when said location whereat said finger contacts said linear contact portion is changed during a period extending from when said finger first contacted said linear contact portion until said contact was removed, an input object that is correlated by said second correlation with a location along said linear contact portion currently contacted by said finger; and determining as current user input said input object that is detected at a contact end location by said input object detecting.

15. The input object selection method according to claim 14, further comprising the step of:

displaying said correlation being associated with said first intervals.

16. The input object selection method according to claim 14, further comprising the step of:

displaying said correlation, being associated with said first intervals, during said finger contact period.

17. The input object selection method according to claim 16, further comprising the steps of:

displaying said first correlation; and halting the display operation during said finger contact period.

18. The input object selection method according to claim 14, further comprising the steps of:

detecting first and second pressure ranges that, relative to a linear contact portion, differ in finger contact pressure; and more greatly increasing said second intervals when said finger contact pressure relative to said linear contact portion falls in said first pressure range during said finger contact period, than when said finger contact pressure falls in said second pressure range.

19. The input object selection method according to claim 14, further comprising the steps of:

detecting whether a finger contact pressure relative to said linear contact portion is equal to or greater than a predetermined value, or smaller than said predetermined value; and changing said second intervals each time, during said finger contact period, said finger contact pressure relative to said linear contact portion is changed from less than said predetermined value to equal to or greater than said predetermined value.

20. The input object selection method according to claim 14, further comprising the steps of:

detecting third and fourth pressure ranges that differ in finger contact pressure relative to a linear contact portion; and maintaining, when said finger contact pressure relative to said linear contact portion falls in said third pressure range during said finger contact period, the locations of said linear contact portion that are correlated with said input objects by said second correlation, even though said finger is slid along said linear contact portion, and moving, when said finger contact pressure falls in said fourth pressure range, said locations of said linear contact portion, which are correlated with said input objects by said second correlation, in the direction in which said finger is slid toward said linear contact portion.

21. The input object selection method according to claim 14, further comprising the steps of providing recessed and raised portions and forming said linear contact portion, recessed portions and raised portions at predetermined intervals.

22. The input object selection method according to claim 14, further comprising the step of:

performing a process other than the selection of an input object when, during said finger contact period, said finger is slid along said linear contact portion from said contact start location a distance equal to or greater than a predetermined length.

23. The input object selection method according to claim 14, further comprising the steps of providing said input objects as either one of characters or menu items.

* * * * *